United States Patent [19]
Wereb

[11] Patent Number: 4,963,829
[45] Date of Patent: Oct. 16, 1990

[54] SHAFT ROTATION ANALYZER USING VARIABLE CAPACITANCE TRANSDUCER MAINTAINED AT A CONSTANT VOLTAGE

[76] Inventor: John A. Wereb, 5507C Sutton La., P.O. Box 703, Willoughby, Ohio 44094

[21] Appl. No.: 171,368

[22] Filed: Mar. 21, 1988

[51] Int. Cl.$^5$ ............................................. G01R 27/26
[52] U.S. Cl. ................................... 324/660; 324/686; 324/176; 324/177; 340/870.37
[58] Field of Search ............... 324/61 R, 61 P, 60 C, 324/60 CD, 166, 176, 160, 658, 660, 687, 686, 177; 340/870.37

[56] References Cited

U.S. PATENT DOCUMENTS

| | | | |
|---|---|---|---|
| 2,929,023 | 3/1960 | Mishcon et al. | 324/168 |
| 2,941,397 | 6/1960 | Lee | 340/870.37 |
| 3,147,374 | 9/1964 | Diamond | 324/61 P |
| 3,225,299 | 12/1965 | Middendorf | 324/160 |
| 3,702,467 | 11/1972 | Melnyk | 340/870.37 |
| 4,007,454 | 2/1977 | Cain et al. | 340/870.37 |
| 4,072,051 | 2/1978 | Peterson | 73/194 M |
| 4,142,144 | 2/1979 | Rohr | 324/61 R |
| 4,214,483 | 7/1980 | Young | 324/160 X |
| 4,350,981 | 9/1982 | Tanaka et al. | 340/870.37 |
| 4,364,046 | 12/1982 | Ogasawara et al. | 340/870.37 |
| 4,410,852 | 10/1983 | Guretzky | 324/61 P |
| 4,477,810 | 10/1984 | Tanaka et al. | 340/870.37 |
| 4,482,859 | 11/1984 | Fournier | 324/61 QS |
| 4,499,465 | 2/1985 | Tanaka et al. | 340/870.37 |
| 4,641,519 | 2/1987 | Klein et al. | 73/129 |
| 4,779,094 | 10/1988 | Lee et al. | 324/61 R X |
| 4,839,646 | 6/1989 | Tyson | 324/166 X |

OTHER PUBLICATIONS

Bryner et al, "Sliding Capacitive Displacement Transducer", NASA Tech Briefs, (Feb. 1987).
Tobey et al, Charge Amplifiers article, Operations Amplifiers: Design and Applications, pp. 233–235, McGraw-Hill, (1971).
Wolffenbuttel et al, "Capacitance-to-Phase Angle Conversion for the Detection of Extremely Small Capacities", IEEE Transactions on Instrumentation and Measurement, vol. IM-36, No. 4, pp. 868–872, (Dec. 1987).
"FET Op Amps Convert Photodiode Outputs to Usable Signals", Jerald Graeme, EDN, pp. 205–220, Burr-Brown Corp., (Oct. 29, 1987).

Primary Examiner—Reinhard J. Eisenzopf
Assistant Examiner—Robert W. Mueller
Attorney, Agent, or Firm—Nixon & Vanderhye

[57] ABSTRACT

A variable capacitor whose capacitance is a function of shaft position is coupled to a rotating shaft. A constant voltage is applied to the capacitor. As the shaft rotates, the changing capacitance of the variable capacitance causes current to flow into and out of the variable capacitor in response to the shaft rotation—thus providing a current source with no inherent practical frequency response limitations. A transresistance amplifier converts the current to an output voltage which is proportional to instantaneous shaft velocity. Various arrangements are used to eliminate the discontinuity associated with the inherent sign change of the capacitance time derivative while retaining the signal components associated with instantaneous velocity changes of the rotating shaft. The broadband instantaneous velocity response of the resulting shaft rotation analyzer has numerous applications in the detection of "signatures" of rotating shafts—such as shaft speed variations attributable to electric motor commutator contact, cogging variations, and torque pulsations due to the firing of cylinders in reciprocating engines.

46 Claims, 12 Drawing Sheets

FIG. 5a
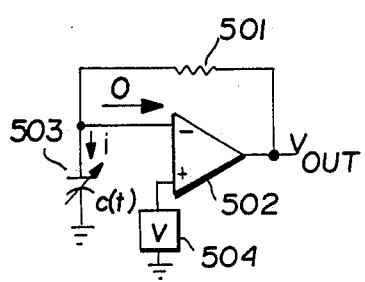
FIG. 4a
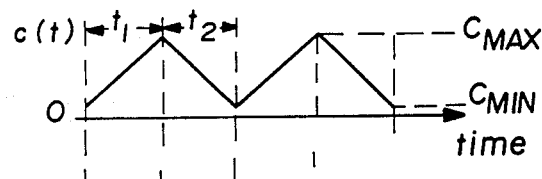
FIG. 4b
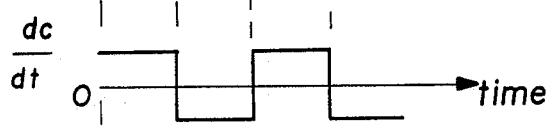
FIG. 4c
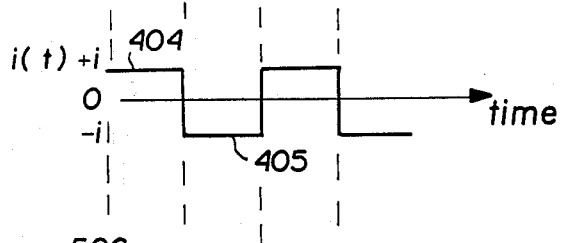
FIG. 5b
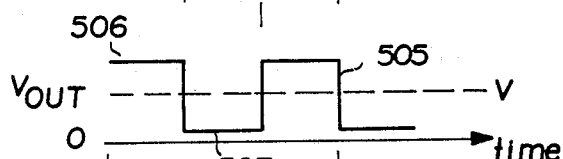
FIG. 5d
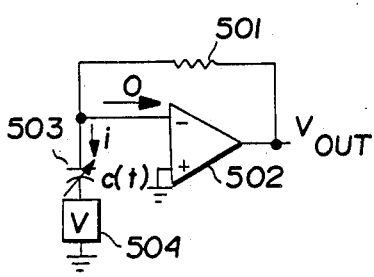
FIG. 5c
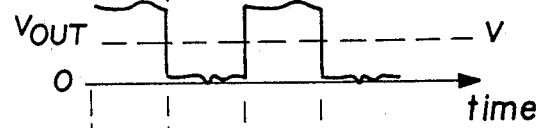
FIG. 5e
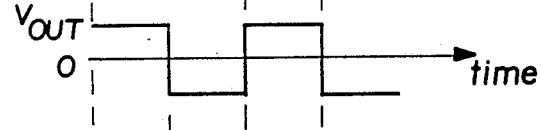
FIG. 5f
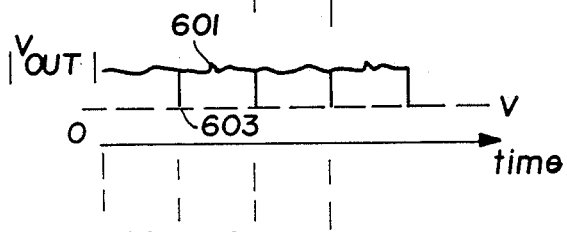
FIG. 6b
FIG. 6d

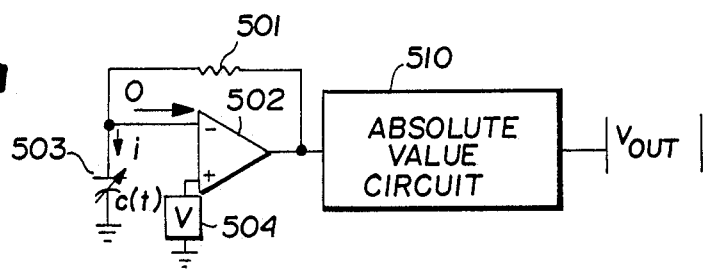
FIG. 6a
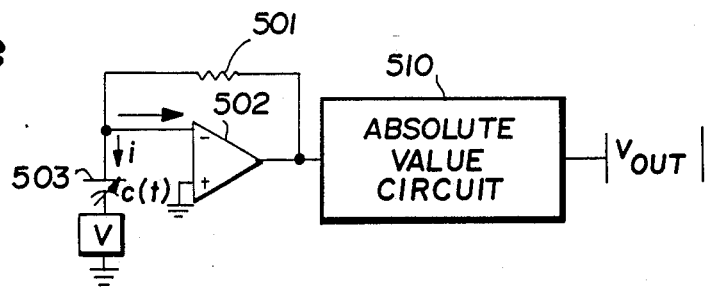
FIG. 6c
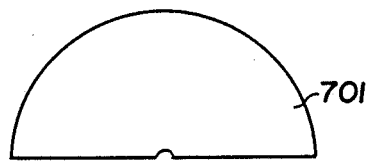
FIG. 7a
FIG. 7
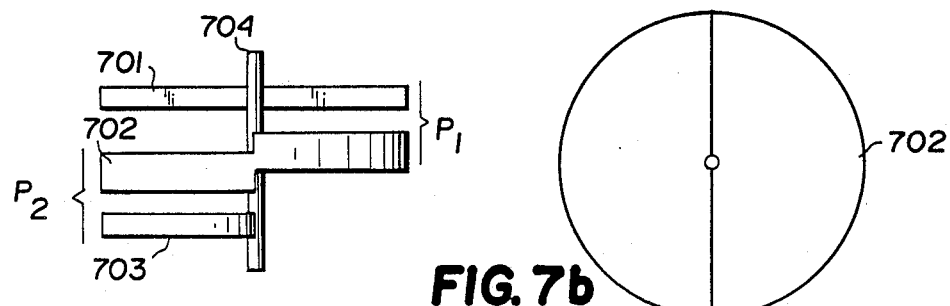
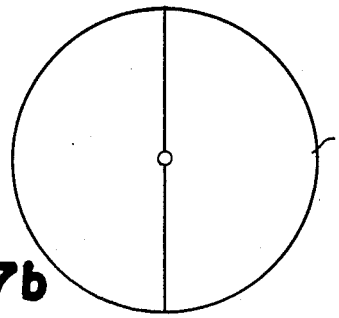
FIG. 7b
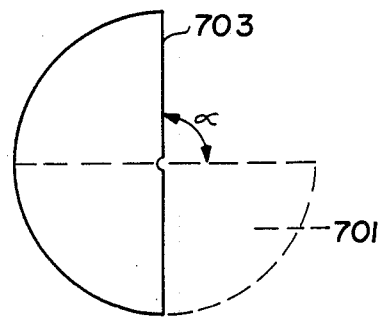
FIG. 7c

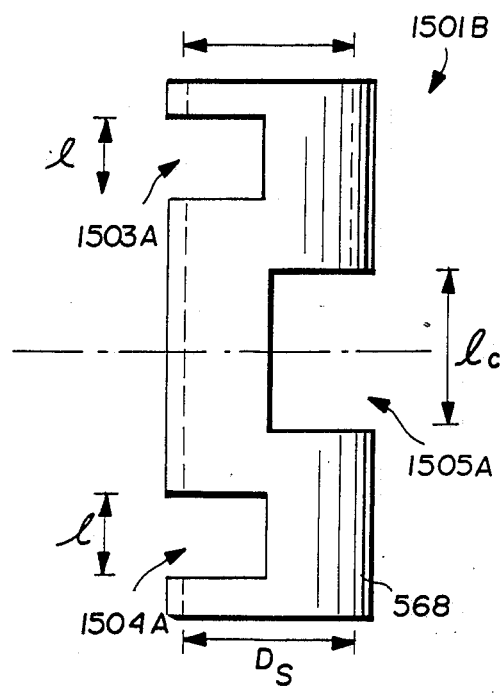
FIG. 17A
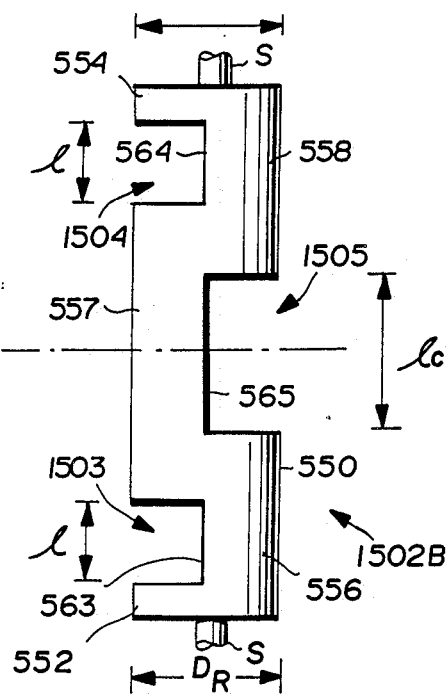
FIG. 18A
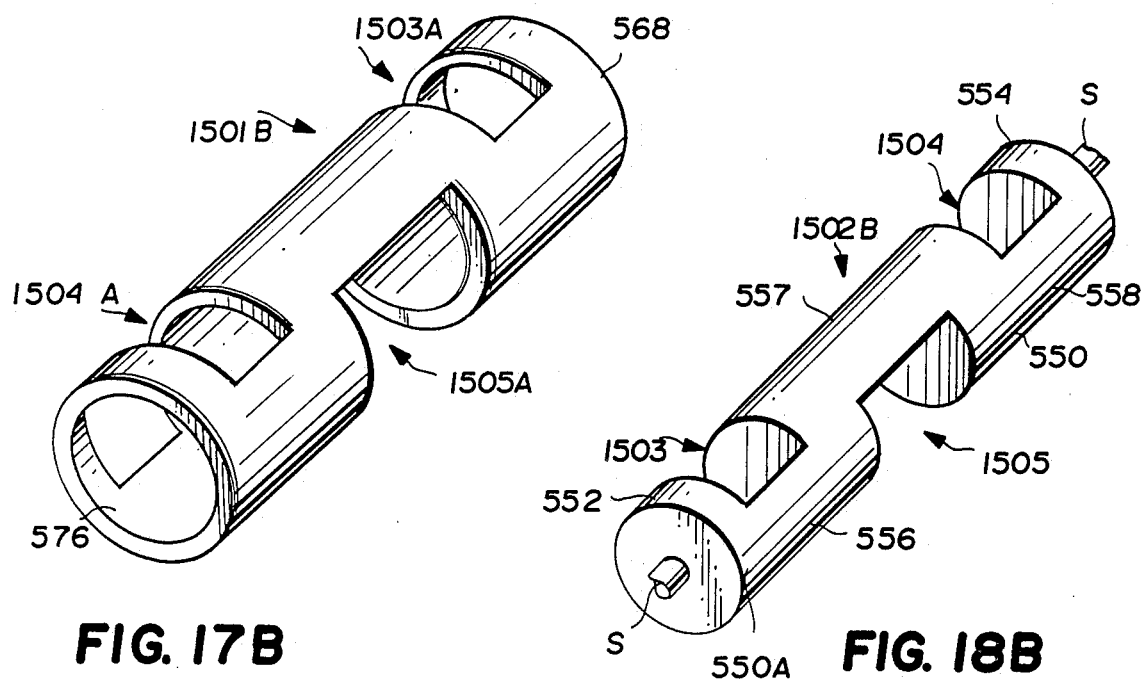
FIG. 17B
FIG. 18B

SHAFT ROTATION ANALYZER USING VARIABLE CAPACITANCE TRANSDUCER MAINTAINED AT A CONSTANT VOLTAGE

FIELD OF THE INVENTION

The invention relates to shaft translational and rotational measuring devices, and more particularly to tachometers and shaft rotation analyzers which measure rotation-related shaft parameters such as angular position, velocity and acceleration.

BACKGROUND AND SUMMARY OF THE INVENTION

Monitoring the rotational characteristics of a rotatable shaft with high accuracy has been very difficult to achieve in the past, and yet is extremely useful in many applications. Prior art shaft position encoders using optical, electrical (impedance) or mechanical angular position sensing arrangements are useful for obtaining average shaft rotation velocity measurements. Unfortunately, such arrangements are generally of limited capability in measuring instantaneous shaft velocity accurately. In addition, most of these techniques cannot be used to measure the velocity of very slowly rotating shafts without the introduction of considerable complexity and attendant measurement error.

For example, one commonly-used prior art shaft position encoder arrangement includes a ring or disk mounted on the shaft, the ring defining equally spaced apertures about its circumference. Light produced by a light source on one side of the ring is sensed by an optical sensor on the other side of the ring. As the shaft rotates, the ring alternately passes and occludes light travelling along the path between the light source and the light sensor. Average shaft rotational velocity can be determined by various methods, such as timing the periods between receipt of adjacent light pulses or counting the pulse rate.

An important disadvantage of this type of prior art rotational sensing arrangement is that its accuracy is inherently limited by the number of apertures defined by the ring and by the accuracy of the (ideally uniform) spacings between apertures. Moreover, this type of measuring arrangement has a resolution limit relative to the measurement of the instantaneous angular velocity of the shaft which is determined by the aperture spacing. As this is a sampling process, the number of apertures per unit time determines the maximum sampling frequency, and thus there is a rather well defined frequency limit to the variations which can be detected. The average rotation speed can be sensed by means of a counter, but spectral analysis and/or filtering are required to determine the presence of speed variations—and the maximum detectable frequency of such speed variations is limited to a frequency of one-half the pulse rate (aperture frequency) or less.

Hence, although optical encoding transducers are capable of producing reasonably accurate macroscopic measurements of average shaft velocity, they are inherently limited in resolution and frequency response in their ability to respond to instantaneous variations in shaft velocity over small angular displacements—such as variations caused by shaft imbalance, shaft loading, shaft torsion, and gear cogging.

Continuous shaft position transducers are generally known. For example, the following (by no means exhaustive) list of prior-issued U.S. patents disclose prior art relevant to capacitive shaft rotation transducers:

U.S. Pat. No. 3,702,467 Melnyk (1972)
U.S. Pat. No. 4,350,981 Tanaka et al (1982)
U.S. Pat. No. 4,364,046 Ogasawara et al (1982)
U.S. Pat. No. 4,410,852 Guretzky (1983)
U.S. Pat. No. 4,477,810 Tanaka et al (1984)
U.S. Pat. No. 4,482,859 Fournier (1984)
U.S. Pat. No. 4,499,465 Tanaka et al (1985)

The typical shaft transducer disclosed in the patents listed above includes a variable capacitor coupled to a rotating shaft, the capacitance of the variable capacitor varying in response to rotation of the shaft. Typically, the prior art utilizes the changing impedance of the variable capacitor rotational transducer as a measure of shaft rotational position. For example, the variable capacitor may be connected to an alternating current (AC) oscillator circuit which generates an alternating current signal the frequency of which depends on transducer capacitance (much as the tuning frequency of a common table radio receiver changes with the capacitance of a variable tuning capacitor). The oscillator frequency changes as the capacitor shaft rotates. Various techniques (most of which require complex frequency demodulation circuitry) are used to extract positional information as well as velocity information derived from rate of change of position from the resulting alternating current signal.

See also Bryner et al, "Sliding Capacitive Displacement Transducer", *NASA Tech Briefs*, (February 1987), which discloses a linear displacement sensor circuit using a tubular variable capacitor transducer.

While such prior art arrangements are useful in some applications, they generally have the disadvantage that the variable-frequency AC signal cannot be used directly to indicate shaft rotational speed accurately, but must instead be processed further (often with complex circuitry such as balanced modulators or ring demodulators which are capable of determining frequency changes) to derive a signal which indicates shaft speed. As a result, the prior art shaft rotational measuring systems are expensive, sometimes unreliable, and are often of limited accuracy due to errors such as those introduced by the frequency dependence inherent in AC frequency-determining or demodulating circuitry.

Readout circuits for capacitive transducers using DC-operated and AC-operated charge amplifiers are generally known. For example, Tobey et al, *Operations Amplifiers: Design and Applications*, McGraw-Hill (1971) describes (at pages 233–35) DC-operated charge amplifiers for capacitive transducers. Wolffenbuttel et al, "Capacitance-to-Phase Angle Conversion for the Detection of Extremely Small Capacities," *IEEE Transactions On Instrumentation and Measurement*, Vol. IM-36, No. 4, pp. 868–872 (December 1987) describes capacitive transducer readout using an AC-operated charge amplifier. These arrangements have been used for sensing pressure, displacement, touch and acceleration. However, so far as I am aware, such techniques have not in the past been used to measure shaft rotation (and instantaneous shaft velocity).

In contrast to the arrangements described above, the present invention provides a signal proportional to true instantaneous shaft velocity. This signal provides information about all rotational vibrations of a shaft which may be caused by any device causing the shaft to move or producing variations in its motion. Examples of sources of vibration are the characteristics of gear teeth meshing together in a gear box, loose particles in lubricants, faulty bearings, and commutators on motors.

The present invention provides shaft rotation sensing which is highly reliable, requires no complex frequency generating or detecting circuitry, has no inherent low frequency limitation, and can easily have a practical upper frequency limit in excess of 50,000 Hz (e.g., 3,000,000 RPM). The signals produced by a sensor in accordance with the present invention are quite sensitive to true instantaneous shaft movements—so that a "signature" of a rotating shaft can be determined. This signature contains unique characteristics indicating such things as very small instantaneous speed variations due to gear tooth meshing, motor commutator contacting cogging, and/or shaft imbalance.

By providing accurate, direct measurements of virtually all shaft speed variations, the instantaneous shaft rotation analyzer provided by the present invention helps determine extremely useful information about shaft and associated driving machine operation (e.g., need for lubrication; failure of bearings, commutators, windings or the like; and variable shaft loading).

In one embodiment of the present invention, a rotatable shaft is coupled to a rotatable, continuously-variable capacitor. A constant voltage is applied across the capacitor rotor and stator plates. The capacitance between the capacitor rotor and stator plates changes linearly with shaft rotation over an increment of rotation so that the current flow to/from the capacitor is a direct measure of the time rate of change of the capacitance (i.e., rotational velocity).

This resultant current from the varying capacitor "current source" is converted to an output voltage, e.g., by means of a transresistance (or transimpedance) amplifier circuit. The output signal includes a superposition of:

(a) a time-varying signal proportional to the instantaneous time rate of change of capacitance (and therefore instantaneous shaft rotational velocity—that is, shaft position change with respect to time), and (b) a periodic signal (e.g., a square wave) having a frequency related to the frequency of rotation and the number of capacitor poles, as well as having a peak-to-peak amplitude which is proportional to average rotational velocity (or speed).

Various arrangements may be used to eliminate the periodic signal component while retaining all useful signal data.

There are a number of applications where useful diagnostic information is somewhat shaft-synchronous and can be obtained from a time-domain trace. For example, the signature obtained from the commutator on d.c. motors of all sizes can be used to analyze motor performance. A similar type of data can be obtained from reciprocating engines of all types, as the torque pulse produced by each cylinder will generate a signature having an amplitude-time trace which permits a detailed diagnosis of the loading symmetry. Even the nature of combustion may be examined due to the instantaneous velocity characteristics of the variable capacitance tachometer.

Some types of data are not necessarily synchronous, such as those associated with gear boxes and belts—which do not necessarily run at integral multiples of the shaft speed nor are even necessarily related to the shaft speed by ratios of small integers. However, signature information of this type can be recorded and observed in the frequency domain by means of spectral analysis of the data with the Fast Fourier Transform (FFT) or other frequency domain analysis techniques. In this case, it may be important that spectral magnitudes be averaged, so that contributions from asynchronous data would be cumulative.

Another useful application for the sensor in accordance with the present invention is in permanent installations where the sensor can be used for both monitoring and control (and not merely to obtain diagnostic information). In these applications, the present invention has three distinct advantages over other types of tachometers: (1) increased sensitivity, (2) increased frequency range, and (3) introduction of minimal extraneous data due to fundamental linearity of the sensor with respect to rotational speed and position.

BRIEF DESCRIPTION OF THE DRAWINGS

These as well as other features and advantages of the present invention can be better and more completely understood by studying the following detailed description of presently preferred exemplary embodiments together with the appended drawings, of which:

FIGS. 4A–4C are schematic diagrams graphically illustrating parameters related to current flowing in a time varying capacitance of the type shown in FIG. 3B driven at a constant rotational velocity;

FIGS. 5A and 5D are schematic diagrams graphically illustrating exemplary amplifier circuits which convert the current flowing through a variable capacitor to usable electrical signals;

FIGS. 5B–5F are graphical illustrations of exemplary resultant signal waveforms present in the FIG. 5A and 5D circuits;

FIGS. 6A and 6C are schematic block diagrams of exemplary circuits which produce characteristic electrical signatures proportional to the mechanical motion of a capacitor rotor;

FIGS. 6B and 6D are schematic diagrams graphically illustrating signal waveforms produced by the circuits shown in FIGS. 6A and 6C;

FIG. 7 is a side perspective view of an exemplary rotational linear one-pole, two-phase capacitor;

FIGS. 7A–7C are plan views of the elements of the FIG. 7 capacitor;

FIGS. 16–19 schematically illustrate variable capacitor constructions which are inherently balanced and less susceptible to large errors in machining and construction;

DETAILED DESCRIPTION OF PRESENTLY PREFERRED EXEMPLARY EMBODIMENTS

Figure 1:
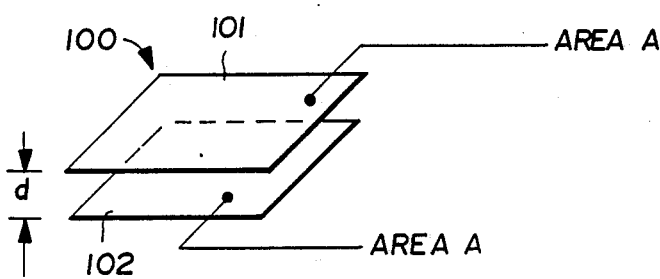
FIG. 1 schematically shows a basic capacitor construction.

FIG. 1 is a side perspective schematic view of the basic construction of a two-plate air capacitor 100. Two flat rectangular metal plates 101, 102 are placed parallel to one another and separated a distance d so that each plate exposes an area A to the other plate. The ability of plates 101, 102 to hold an electrical charge, Q, is represented by $$Q = C \cdot V \tag{1}$$

where Q is the charge in Coulombs, V is the voltage in Volts, and C is the capacitance in Farads.

The geometric relation for the value of capacitance is given by Equation 2 below:

$$C = \epsilon_r \epsilon_o A / d \tag{2}$$

where $\epsilon_r$ is the relative permittivity, $\epsilon_o$ is the free space permittivity, A is the effective area of the capacitor plates, and d is the spacing between the plates.

The capacitance of this simple capacitor 100 can be made to vary by changing with time the relative dielectric constant with time, the effective area A, the spacing d between the plates, or a combination of any of these parameters.

Equation 3 represents the derivative of Equation (1) with respect to time:

$$i = dq/dt = C \, dv/dt + V \, dC/dt \tag{3}$$

where i is the current in amperes.

If V is held constant, then $C \, dv/dt = 0$ and Equation 3 reduces to $$i = dq/dt = V \, dC/dt \tag{4}$$

where V is a time-independent voltage.

Figure 2:
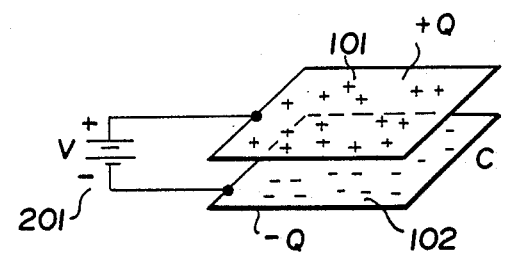
FIG. 2 is a schematic diagram illustrating the basic charge holding, characteristic of the FIG. 1 capacitor.

FIG. 2 shows the same two plates 101, 102 depicted in FIG. 1 with a constant voltage source 201 connected across the plates so that a charge of magnitude Q (Q=CV) will be present on both plates. Since V is a constant, the charge Q is proportional to the capacitance C.

Figure 3A:
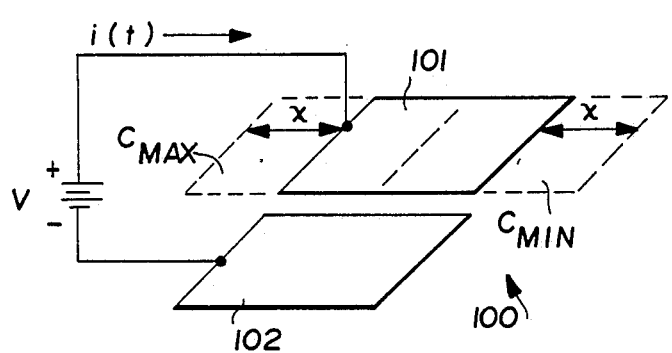
FIG. 3A is a schematic diagram illustrating current flowing into/out of a capacitance variable with translation and having constant voltage impressed across it.

FIG. 3A represents the same capacitor 100 shown in FIG. 1 with the bottom plate 102 fixed in position and the top plate 101 moveable (translatable) such that the plate separation d —remains constant, but common area $A_{effective}$ varies from a minimum of zero to a maximum of A where A is the area of (the smaller) one of plates 101, 102. As $A_{effective}$ changes, C changes proportionately. When C is increasing, i is positive, delivering additional charge Q to the capacitor; when C is decreasing, i is negative, taking charge Q from the capacitor. If C increases and decreases linearly with time and at the same rate (a physical impossibility at the capacitance extremities due to fringing and other effects of capacitor 100), the resultant idealized waveforms C(t), dC/dt, and i(t) with respect to time will be those shown in FIGS. 4A–4C, respectively.

Figure 3C:
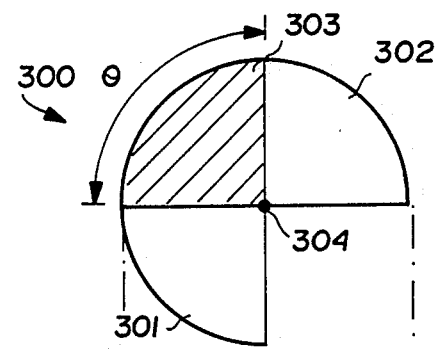
FIGS. 3B and 3C are schematic diagrams illustrating an exemplary rotatable variable capacitor having a constant voltage applied across it.
Figure 3B:
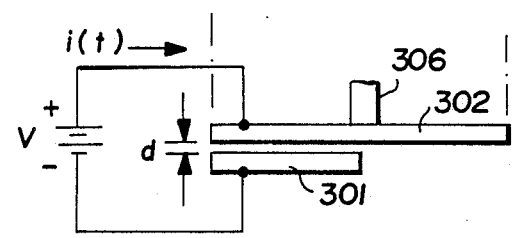

A single pole, single phase rotary capacitor 300 is shown in FIGS. 3B and 3C. Two semi-circular flat plates 301, 302 of area A are separated by a distance d. One of the two plates (a stator 301) is fixed, and the other plate (rotor 302) rotates with respect to the stator about a shaft 306 disposed along an axis 304 common to both the stator and the rotor. Assume that both the stator and rotor are half-circles (for an N-phase device, this is not a requirement—an N-phase transducer consisting of N variable capacitors with electrical phase angles between the capacitors will be described in detail shortly). Rotation of the transducer shaft 306 (FIG. 3B) causes the capacitance to vary from a minimum to a maximum and back to a minimum over one shaft revolution. This change in capacitance with position (differential) can be related to time by the following equation:

$$\begin{aligned} dC/dt &= [dC/dx] \cdot [dx/dt] \\ &= [dC/d\theta] \cdot [d\theta/dt] \end{aligned} \tag{5}$$

where x is any type of motion (e.g., translational or rotational), C is the capacitance, t is time, and $\theta$ is the shaft 306 rotational angle shown in FIG. 3B.

If dC/dx is constant in magnitude, then dC/dt is proportional to velocity (dx/dt). From Equation (4), we can conclude that the current i is also proportional to the velocity. This velocity can be either translational (dx/dt) or rotational (d$\theta$/dt), depending on the design and application of the transducer (in the FIG. 3A capacitor, A is the area between capacitor plates which varies with time because translation x is varying with time). In the FIG. 3B capacitor, $\theta$ varies with time as the capacitor shaft 306 rotates.

The resultant waveforms shown in FIGS. 4A–4C (for constant velocity, dx/dt) are the same for FIG. 3A (translational) and 3B (rotational). Although it is relatively simple to make dC/dx (or dC/d$\theta$) constant in magnitude (neglecting second order effects such as fringing) for both of these examples, the sign change of dC/dx when C passes through an extremity results in a polarity change each half cycle.

In FIG. 4A, C is varied with time in a linear fashion. The time intervals $t_1$ and $t_2$ repeat and are of equal magnitude and duration (although this is not a requirement in the preferred embodiment). This results in a periodic change in C between $C_{maximum}$ and $C_{minimum}$. The waveform of FIG. 4B shows the rate of change of C (dC/dt) having equal magnitude but opposite sign. FIG. 4C shows the two values of constant current (+i) and (−i) that flow (periodically in alternating directions) as a result of holding the voltage across the variable capacitor fixed, and maintaining a constant magnitude (excluding sign) of dC/dt and a constant velocity (dx/dt).

In order to produce a usable signal, it is desirable to measure this current i by some means while maintaining a constant voltage on the variable capacitor. Two exemplary circuits shown in FIGS. 5A and 5D include variable capacitors having constant voltages applied between their plates which can be used in a motion measuring device. One difference between these two circuits (FIG. 5A and FIG. 5D) is the arrangement used to establish a constant voltage V on the variable capacitor. The circuit sensitivity, $[dv_{OUT}/dt]/[dx/dt]$ is proportional to three quantities: R (the resistance of resistor 501), dC/dx and V. Consequently, increasing R and/or V will increase the sensitivity. Also, increasing the capacitor magnitude (either by increasing the area, increasing the relative permittivity or decreasing the spacing between plates) will also increase the sensitivity proportionately to the magnitude increase.

A single supply electronic circuit such as is shown in FIG. 5A is one exemplary arrangement for measuring the current flowing through a variable capacitor while maintaining a constant voltage V on the capacitor. A resistor 501 is connected between the output and the inverting (−) input of an operational amplifier ("op amp") 502. A variable capacitor C 503 is connected between operational amplifier 502 inverting input and ground potential. The voltage V is impressed on the non-inverting (+) input of the amplifier by means of a bias voltage of magnitude V produced by constant voltage source 504 is connected between the op amp non-inverting input and ground. The inherent nature of an operational amplifier is that in its linear region of operation, both the inverting and non-inverting inputs remain at the same potential except for a relatively small offset voltage—so that op amp 502 holds the constant voltage V at the amplifier inverting input. One possible disadvantage of this circuit for some applications is that the resultant op amp output signal also has the voltage V superimposed on it as a DC component (see FIGS. 5B,5C).

This DC component can be eliminated from the output by using the dual supply electronic circuit shown in FIG. 5D with placement of the capacitor bias voltage V directly on (in series with) the capacitor. Another potential advantage of the FIG. 5D circuit is that the voltage V can now be increased substantially in magnitude if desired without fear of exceeding the op amp input voltage ratings—resulting in a substantial increase in transducer gain since V multiplies dC/dt (see Equation 4). The input of the amplifier 502 is at virtual ground in the FIG. 5D circuit, so that the output signal $v_{OUT}$ no longer contains the bias voltage V component (see FIGS. 5E,5F).

FIGS. 5B and 5E show the resulting waveforms, $v_{OUT}$, at the outputs of the FIG. 5A and 5D circuits, respectively, for constant rate of change of the capacitance of capacitor 503 with time. Equations 6A and 6B below are the resultant expressions for the respective output voltages:

$$\text{time interval FIG. 5B, 5C FIGS. 5E, 5F} \quad (6)$$

$$t_1; \quad v_{OUT} = V + iR \quad v_{OUT} = +iR \quad (6a)$$

$$t_2; \quad v_{OUT} = V - iR \quad v_{OUT} = -iR \quad (6b)$$

The output of the FIG. 5D circuit is identical to that produced by the FIG. 5A circuit except that the output can be either positive or negative (in the preferred embodiment it is symmetric about zero) and the DC component bias voltage V is not present due to connection of the voltage source 504 directly to the variable capacitor 503. A combination of these two placements of the bias voltage could also be used if desired (i.e., two voltage sources could be used, one connected as shown in FIG. 5D and the other connected as shown in FIG. 5A).

The flat-topped (and flat bottomed) waveforms of FIGS. 4B, 4C, 5B and 5E correspond to dx/dt not varying with time (constant velocity) and dC/dx being constant in magnitude (but not sign). FIGS. 5C and 5F show the nature of the output signal resulting from instantaneous variations in translational or rotational velocity coupled to capacitor 503 (i.e., variations in dx/dt due to acceleration/deceleration). Measuring these instantaneous variations is very important in many applications (e.g., in order to measure shaft acceleration, deceleration and the like).

FIG. 6A shows an appropriate absolute value circuit 510 connected to the output of the FIG. 5A circuit, and FIG. 6C shows the FIG. 5D circuit output connected to an absolute value circuit. Absolute value circuit 510 provides the absolute value of a signal connected to its input with respect to a reference level—V (FIG. 6A) or ground (FIG. 6C). An absolute value circuit produces a single polarity output independent of the polarity of the input signal—and can also eliminate a bias voltage (e.g., the voltage V which appears in the output of the FIG. 5A circuit). FIGS. 6B (the signal waveform from the FIG. 5A circuit) and 6D (the signal waveform produced by the FIG. 5D circuit) show the resultant waveforms after processing by such an absolute value circuit 510.

The waveform of FIG. 6B (or 6D) contains average change in capacitance (average velocity) information as well as information indicating changes caused by high frequency or rapid disturbances and variations (acceleration). The value of signal 601 (FIG. 6B) or signal 602 (FIG. 6D) at any time is a direct measure of the "instantaneous velocity" of the change in capacitance of variable capacitor 503. This signal can be integrated to provide positional information.

The capability of measuring the instantaneous velocity of the motion of the rotor of capacitor 503 is a significant advantage—especially since this instantaneous velocity is measured in a linear fashion (since dC/dx is a constant) and has no missing data except during the transition times shown by line 603 in FIG. 6B,6D. The discontinuity ("notch") in the waveform seen every half revolution (for a single pole capacitor) is the result of an abrupt change in dC/dx (and consequently dC/dt) as can be seen from FIGS. 4A,4B,6B and 6D—and appears wherever the change in the capacitance of variable capacitor 503 is no longer linear with shaft rotation. This "notch" has some finite width due to fringing fields of the capacitor and stray capacitance associated with the input circuitry. Minimization of both of these effects with careful design will not eliminate the notch since it is inherent in a one-phase capacitor configuration.

In the presently preferred exemplary embodiment of the present invention, this notch is eliminated by the addition of a second phase (i.e., capacitor pole) and appropriate circuitry. This notch elimination technique will be described next.

Elimination of the Notch From the Output Waveform

FIG. 7 shows an exemplary capacitor arrangement which eliminates the notches from the output signal while maintaining the complete vibration signature of a rotating shaft with no introduction of measurement error due to the circuitry involved. Two identical capacitors, constructed as shown in FIGS. 7-7C, are formed by a common rotor 702 and independent stators 701,703. Stators 701,703 are mounted on a common shaft 704 so that they rotate together but are separated by an electrical phase angle (e.g. $\pi/2$ radians—90° degrees). Stator 701 together with rotor 702 forms one variable capacitor P1, and stator 703 and the rotor form another variable capacitor P2. Capacitors P1,P2 are each single phase single pole capacitors in the embodiment shown, and produce identical waveforms with the vibrational signals coincident but with the notches displaced by the phase angle $\alpha$. The magnitude of the phase angle $\alpha$ is not critical so long as it is several degrees (so that the electrical "notches" associated with each capacitor do not overlap one another).

Figure 8A:
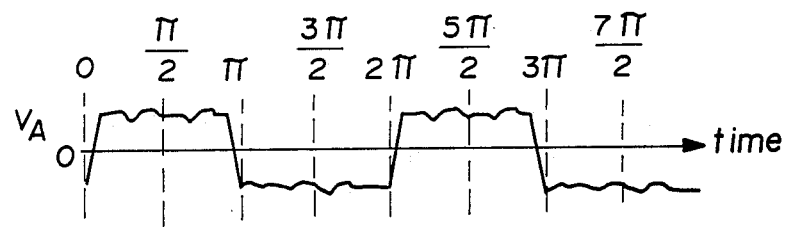
FIGS. 8A–8E are schematic diagrams graphically illustrating the signals produced by the circuit shown in FIG. 9.
Figure 8B:
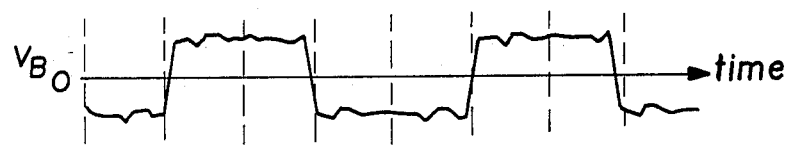

Since $dC/dx$ is designed to be identical for the two capacitors P1,P2 and the two capacitors are driven by the same $dx/dt$ (e.g., shaft rotation), their resultant outputs $dC/dt$ (assuming equivalent amplifier circuitry) will be identical except where a notch occurs. These two resulting waveforms, $v_a$ and $v_b$, are shown in FIGS. 8A and 8B prior to processing by the absolute value circuits discussed previously. FIG. 5D circuits (one for each capacitor phase P1, P2) generate output signals which are inverted in the preferred embodiment to produce the waveforms shown in FIGS. 8A and 8B (the bias voltage V being applied directly to each capacitor P1,P2). Note that the same voltage source can be applied to both capacitors—eliminating a potential error due to two separate sources producing slightly unequal voltages (the choice may be made to use separate supplies, however, since this degree of freedom does allow for an adjustment of the output magnitude).

One way to select the output signal with the notch and to deselect the other output signal is to switch between one output and the other to avoid the notches. Care must be given to the method by which this switching is accomplished, however, since the switching process may introduce a frequency line in the spectrum which is within the portion of the spectrum of interest for shaft rotation analysis. Fortunately, this potential problem can be easily avoided by using the equivalent of a "make before break" switch and switching only when the magnitudes of the two waveforms are equal. However, switching is not necessary in accordance with a feature of the present invention—as will now be explained.

Figure 8C:
Figure 8D:
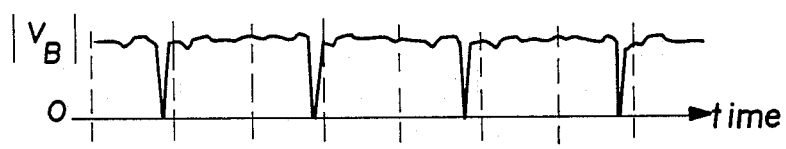
Figure 8E:
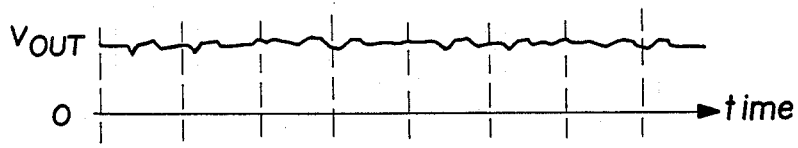

Taking the absolute values of the waveforms shown in FIGS. 8A and 8B result in the waveforms shown in FIGS. 8C and 8D, respectively. These waveforms are identical at any instant of time except when a notch occurs in one or the other waveform. Consequently, if the signal which does not have a notch is selected at any (and all) instants of time during which a notch is present in the other signal, the resulting output is notch-free as is shown in FIG. 8E. The new output signal therefore becomes $$v_{out} = |v_a| \text{ when } |v_a| > |v_b| \quad (7)$$

and $$v_{out} = |v_b| \text{ when } |v_b| > |v_a|$$

Consequently, two signals which are out of electrical "phase" with respect to their notches are fed into absolute value circuits. A single comparator (or other amplitude selecting arrangement) which always may be used to select the larger of the two signals and deselect the smaller signal, i.e., $$v_{out} = |v_a| \text{ or } |v_b| \quad (8)$$

depending on which is larger at any instant of time.

Figure 9:
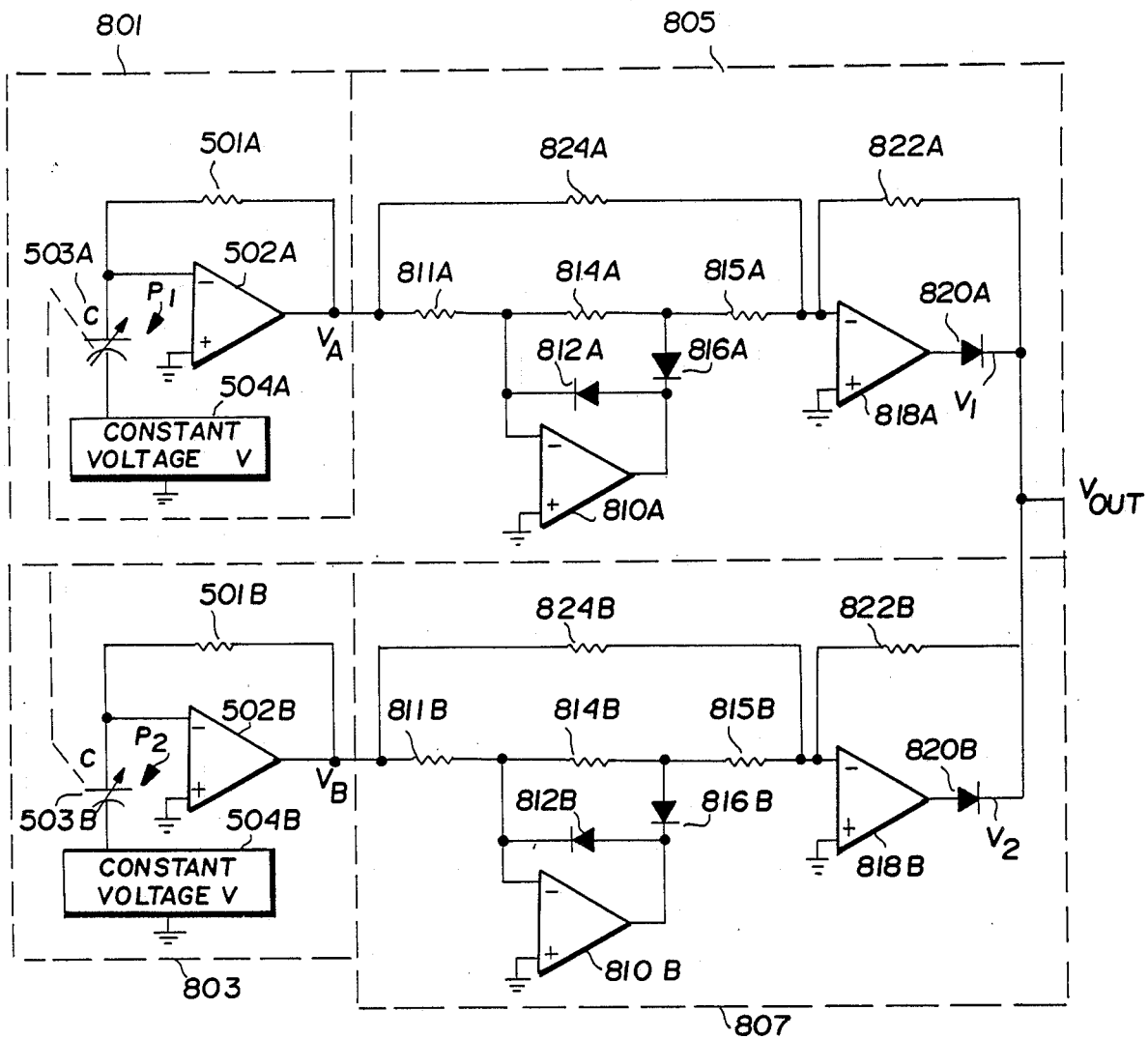
FIG. 9 is a schematic diagram of an exemplary circuit connected to a two-phase variable capacitor.

An example of a circuit which will provide this functionality is shown in FIG. 9. The FIG. 9 circuit includes a first input stage 801, a second (matching) input stage 803, and first and second matching absolute value circuit stages 805, 807. In the exemplary circuit shown, input stages 801, 803 each have the configuration shown in FIG. 5D, and absolute value stages 805, 807 are identical to one another.

Absolute value stage 805 includes an operational amplifier 810A connected with unidirectional devices (e.g., diodes) 812A,816A in a full wave precision rectifier configuration. An input resistor 811A connects the output of op amp 502A to the inverting (−) input of op amp 810A. Diode 812A is connected between the op amp 810A output and the op amp inverting (−) input (with the diode anode being connected to the op amp output). Another diode 816A is connected in series with a resistor 814A in the op amp feedback loop (i.e., between the op amp inverting input and the op amp output, with the diode cathode connected to the op amp output). In the preferred embodiment, feedback resistor 814A and input resistor 811A have about the same resistance. The output of op amp 810A is applied to the inverting input of a further op amp 818A through a series resistor 815A (which preferably has half of the resistance of resistor 814A)—and through diode 816A. A diode 820A and resistor 822A are connected in the feedback path of op amp 818A. A further feedback resistor 824A is connected between the inverting input of op amp 818A and the output of op amp 502A.

When the input signal $V_A$ applied to the input of op amp 810A is negative, the output of op amp 818A is positive; and the output of op amp 818A is also positive when the input to op amp 810A is positive. Diode 812A provides a feedback path for op amp 810A so that it remains in its linear region for negative inputs (operation in the linear region keeps the inverting input of op amp 810A at ground potential, thereby preventing the input signal from driving op amp 818A via feedback resistor 824A). When a positive input voltage $V_A$ is applied to op amp 810A, the op amp produces a negative output $-V_A$, so that resistor 815A applies a current to the input of op amp 818A. In summary, $$V_1 = -(V_A - 2V_A) = V_A, \; V_A > 0$$

$$V_1 = +V_A = V_A, \; V_A < 0.$$

The outputs from matching circuits 805, 807 are hardwired together. Op amp 818A, 818B stages perform a multiplexing function, since the one of these op amps which produces a more positive output level causes the diode 820 connected to the output of the other op amp 818 to become reverse biased—thus effectively deselecting the output of the other op amp. Since the outputs of circuits 805, 807 are never exactly equal (even when both capacitors 503 are operating in linear ranges and no "notches" are present), the output of only one of the circuits is selected at any given time. Because the capacitors P1,P2 are displaced by angle α, "notches" never appear at outputs $V_1$, $V_2$ simultaneously—and the output with the "notch" is never selected because the other output is guaranteed to be more positive.

In three phase operation (i.e., using a variable capacitor with three stator elements), each phase continues for 180 electrical degrees (i.e., greater than 120 electrical degrees) and each signal has a notch staggered by approximately $2\pi/3$ radians or 120°. This signal output from at least one phase is positive at any given instant of time. Consequently, Equation (9) below describes selection of the highest potential signal—in this case the most positive signal. Hence, absolute value or switching circuits are not required if a three-phase variable capacitor is used.

$$v_{out} = v_a \text{ or } v_b \text{ or } v_c \tag{9}$$

(whichever is greater).

Figure 10:
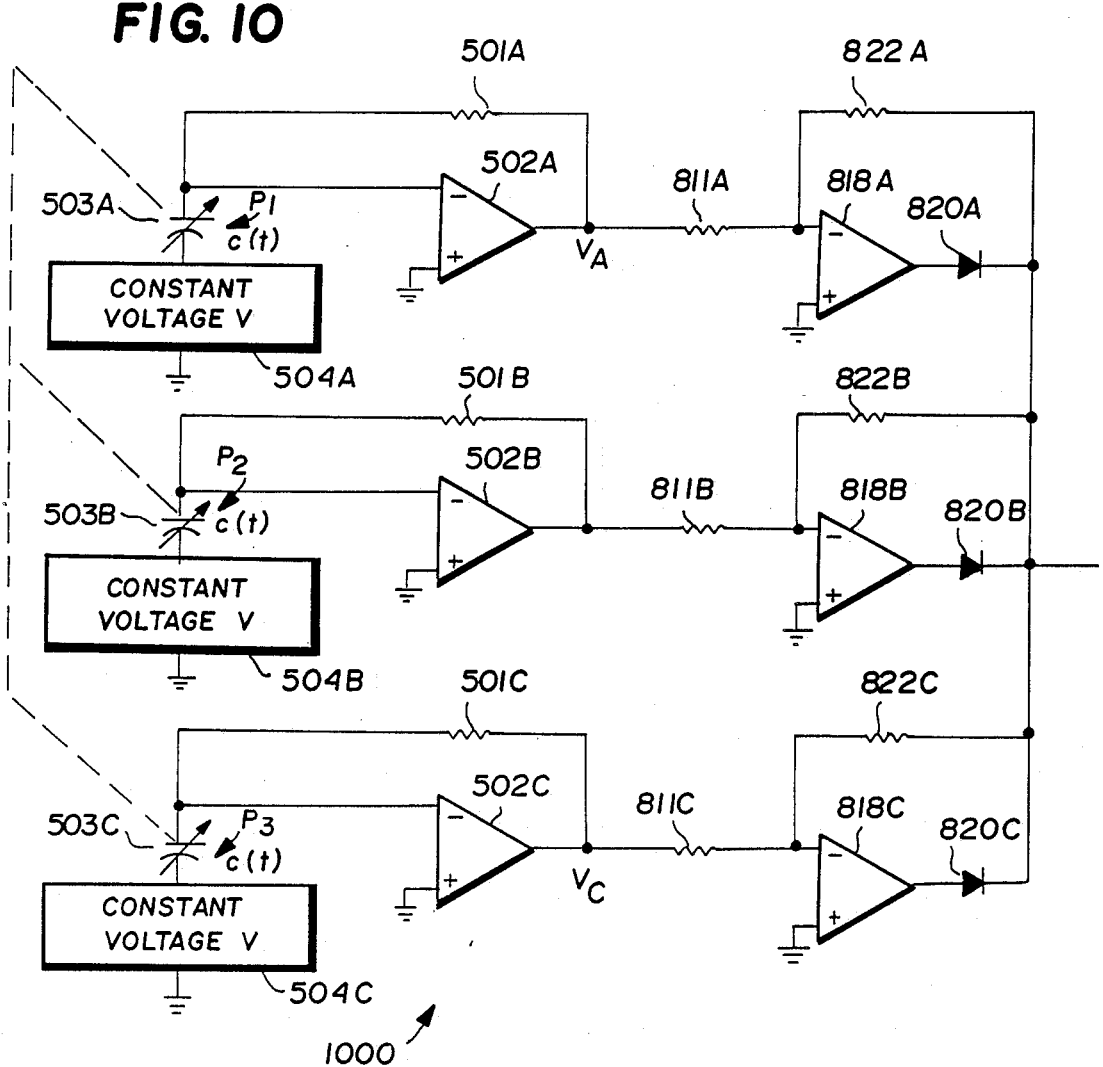
FIG. 10 is a schematic diagram of a practical exemplary three phase circuit.
Figure 10A:
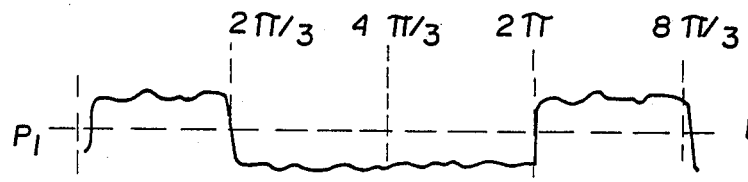
FIGS. 10A–10C are graphical illustrations of the signals produced by the circuit shown in FIG. 10.
Figure 10B:
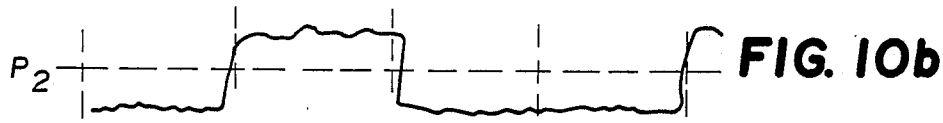
Figure 10C:
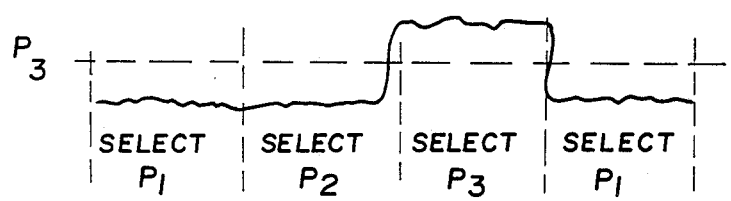

FIG. 10 shows a presently preferred exemplary three-phase variable capacitor sensing circuit 1000 in accordance with the present invention. Three phases may be generated mutually electrically out of phase from one another by approximately 120 degrees ($2\pi/3$ radians) by ganging together three capacitor rotor elements (and appropriate associated stators) P1,P2,P3. For example, the capacitor construction shown in FIG. 7 can be modified (e.g., by adding an additional rotor element and associated stator element). Exemplary signals produced by such a three-phase (one pole) capacitor construction are shown in FIGS. 10A–10C. Three phase operation actually requires fewer amplifiers than two phase operation in the preferred embodiment, since the absolute value of each signal is not required (the stages including op amps 818 simply selecting the single, most positive signal at any given time).

In the FIG. 10 circuit, resistors or diode-resistor combinations may be substituted for the diodes 820 if desired. This substitution has the effect of creating changes in signal levels due to current flow in the resistors and limiting the dynamic range of the output, however.

Since no inverters or absolute value circuits are needed in the FIG. 10 circuit, amplifiers 818A, 818B and 818C automatically amplify the positive part of the largest signal. Additional phases can be added, but sensor complexity may preclude their use in many applications.

In some applications, where the resultant signal is to be digitized and processed to extract information either in the time or frequency domain, it may be simpler to digitize the raw signals produced by the input stage(s). Deriving the absolute value and avoiding the notches can then be performed on the resulting digitized signals using a software-controlled digital signal processor (e.g., a conventional microprocessor or bit slice processor). Sufficient resolution of the digitizing hardware should be used to obtain desired accuracy.

FIG. 3C shows a top view of the basic construction of a rotary capacitor 300. Fixed stator plate 301 makes up one of the half circles shown, and a corresponding rotor plate 302 makes up the other half circle. These two half-circle structures form the two plates of capacitor 300. The FIG. 3B side view shows the plates 301, 302 separated by a distance d, and in the half capacitance position. The rotor 302 is rotated through an angle $\theta$ to provide a common (overlapping) area 303 between the plates. This area varies linearly with angle $\theta$ as expressed by Equation 10 for a semi-circle shape:

$$A_{effective} = \theta\, D^2/8 \text{ for} \tag{10}$$
$$0 \leq \theta \leq \pi \text{ radius},$$
$$A_{effective} = (2\pi - \theta)\, D^2/8 \text{ for}$$
$$\pi \leq \theta \leq 2\pi \text{ radius},$$

where D is the diameter of the rotor 302 and/or the stator 301 (the rotor and stator elements being equal in size in the preferred embodiment).

Figure 11A:
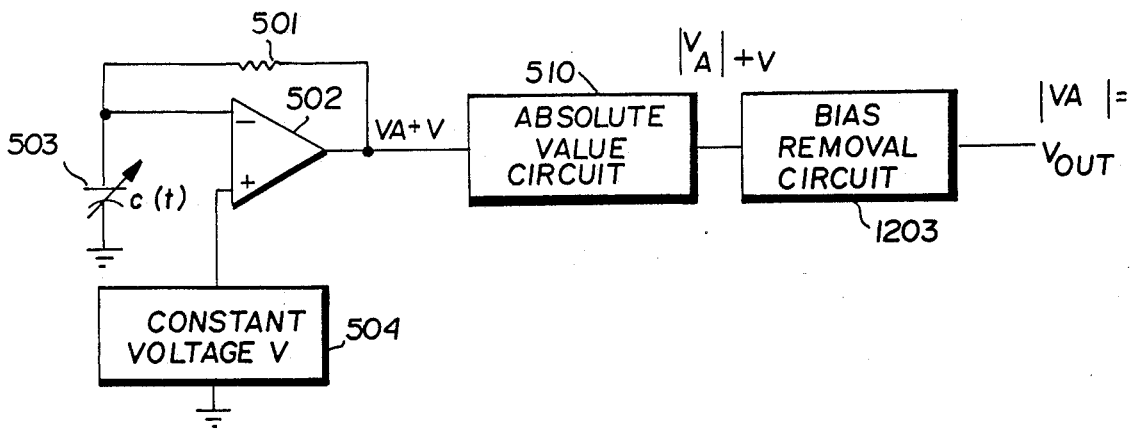
FIG. 11A is a schematic block diagram of an exemplary circuit in accordance with the presently preferred exemplary embodiment of the present invention which can be used to produce useful output signatures from signals produced by the circuits shown in FIGS. 5A, 5D, 6A, 6C and 9.
Figure 11B:
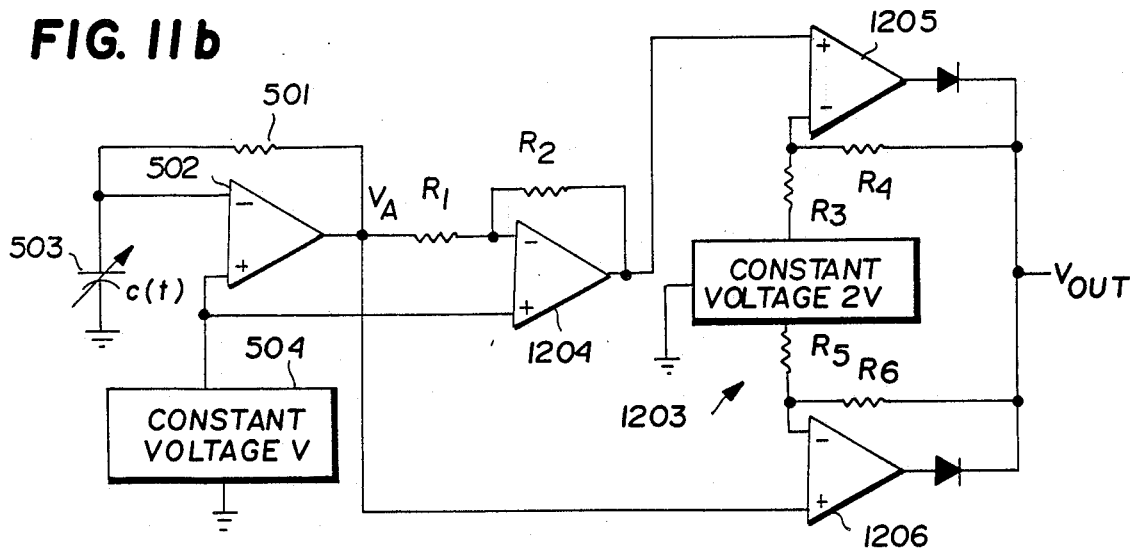
FIG. 11B is a more detailed schematic diagram of the FIG. 11A circuit.

FIGS. 11A and 11B show a preferred exemplary circuit which may be used (e.g., in conjunction with the FIG. 3B rotary capacitor) to produce the shaft signatures electronically. This exemplary circuit measures the vibration signal, converts it to an absolute value, and removes the bias voltages. Other possible analysis on the transducer output signal could involve synchronization, filtering, integration and/or comparison and correlation with associated photoelectric or magnetic reference signals.

Figure 12A:
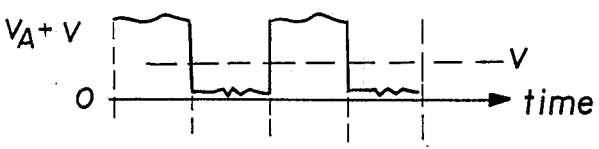
FIGS. 12A and 12B are schematic diagrams graphically illustrating signals produced by the circuits shown in FIGS. 11A and 11B.
Figure 12B:
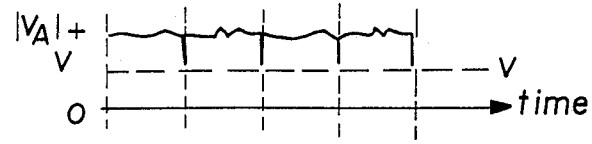

FIG. 11A shows an exemplary circuit which obtains an output from a single phase capacitor. Amplifier 502 and associated components provide the primary signal shown in FIG. 12A, while absolute value circuit 510 produces the absolute value waveform of FIG. 12B. Bias removal circuit 1203 subtracts the bias voltage from the FIG. 12B waveform so that only the signature, including notches, remains.

FIG. 11B is a more detailed schematic diagram of the circuit shown in FIG. 11A, and shows the presently preferred exemplary embodiment of a sensor circuit in accordance with the present invention. Amplifier 1204 is a unity gain inverter which supplies equal out-of-phase signals to the absolute value circuit 1203—which in the preferred embodiment includes amplifiers 1205 and 1206. Amplifiers 1205, 1206 multiply the output of amplifier 1204 by a factor of 2. Because the basic signal produced by amplifier 502 includes a bias voltage component $V_{BIAS}$, a signal level 2 $V_{BIAS}$ is inserted into the inverting inputs of amplifiers 1205 and 1206 (via resistor $R_3$ and resistor $R_5$, respectively). This arrangement subtracts the bias component $V_{BIAS}$ from the output—leaving only the signature component. Amplifiers 1205 and 1206 operate in alternating half-cycles, amplifying only those signals which are greater than V in the positive direction. During the half cycle in which an amplifier 1205,1206 is not amplifying a signal, the amplifier is driven into saturation near zero potential with an effective voltage gain of zero (so that the amplifiers are alternately driven into saturation).

When amplifying signals greater than V, amplifiers 1205 and 1206 have a gain of 2 (this is a result of choosing R3=R4 and R5=R6). Typical component values produce output signals from amplifier 502 that are of a sufficient amplitude to avoid the need for further amplification of the output signal in most applications.

Typical values of the components and variables are as follows:

| | |
|---|---|
| Maximum capacitance, each phase: | $25 \times 10^{-12}$ farad |
| R501 | $470 \times 10^6$ ohm |
| R1,R2,R3,R4,R5,R6 | $100 \times 10^3$ ohm |
| V, constant voltage $6 \leq V \leq 15$ volts | |
| $V_A$, signal from amplifier 502 superimposed on Eb | $10 \times 10^{-3}$ volts per RPM |
| $V_{out}$, absolute Value Signal referenced to common | $20 \times 10^{-3}$ mv per RPM |
| Typical Amplifiers 502,1204, 1205, 1206 | Type CA3140 CA3240 |

Figure 13A:
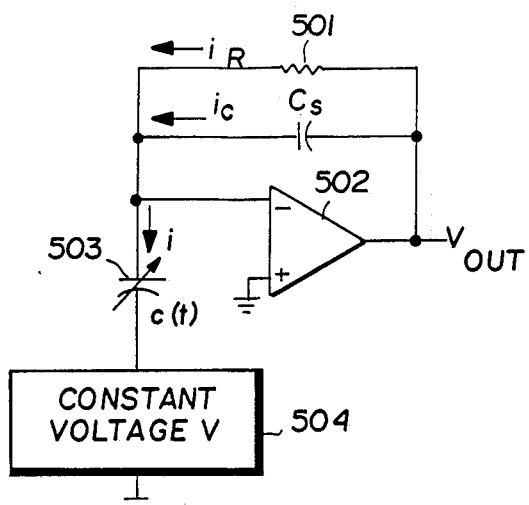
FIGS. 13A–14 are schematic diagrams of alternate exemplary input circuits with improved frequency response characteristics and reduced feedback resistances.
Figure 13B:
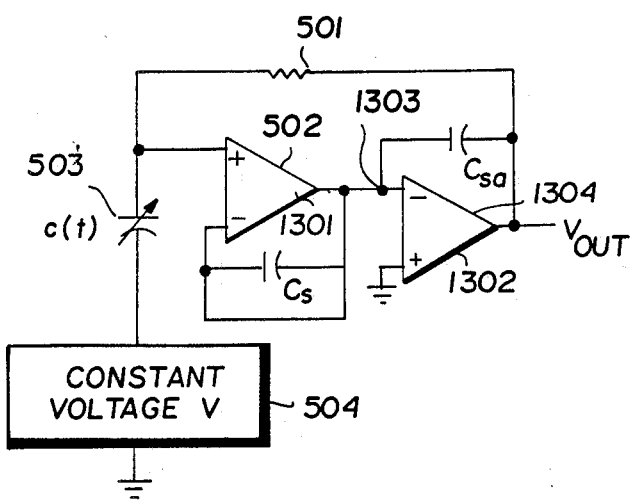

FIGS. 13A and 13B show different exemplary amplifier configurations including additional components for improving frequency response. FIG. 13A is a schematic diagram of the FIG. 5A circuit showing an inherent stray capacitance Cs. Cs results from a combination of pin-to-pin capacitance of the amplifier 502 and circuit board capacitance. In order to get good frequency response characteristics of the signature, the only current that should flow into the capacitor 503 is that flowing through resistor 501—namely $i_R$. Because there is a voltage change at the output of amplifier 502 and no voltage change at the amplifier inverting input, a reactive current $i_C$ from the stray capacitor Cs adds to $i_R$ from the resistor R and degrades the frequency response (so that output level falls off as signal frequency increases).

FIG. 13B shows an exemplary two amplifier circuit which reduces or eliminates the effect of stray capacitance Cs. Unity gain amplifier 502 has a direct short-circuit between its output and its inverting input, thereby shorting the stray capacitance Cs. The variable capacitor transducer 503 is connected to the non-inverting input of amplifier 502. No voltage signals can exist between the output of amplifier 502 and either amplifier input; therefore, there can be no reactive current introduced into capacitor 503 due to stray capacitance Cs (and no frequency degradation of the signal). A large value feedback resistor 501 is connected between the output 1304 of inverting amplifier 1302 and the non-inverting input of amplifier 502. $C_{sa}$ is the inherent stray capacitance existing between the output 1304 of amplifier 1302 and its inverting input 1303. Since impedances are low at the outputs of both amplifiers 1301 and 1302, the reactive current that flows through $C_{sa}$ cannot degrade the frequency response because it is effectively short circuited. The combination of amplifier 1301 and amplifier 502 may be substituted into any of the circuits described previously (and in particular, it is desirable to substitute the FIG. 13B circuit into the input stage 502 of the FIG. 11B circuit in order to obtain improved frequency response).

Figure 14:
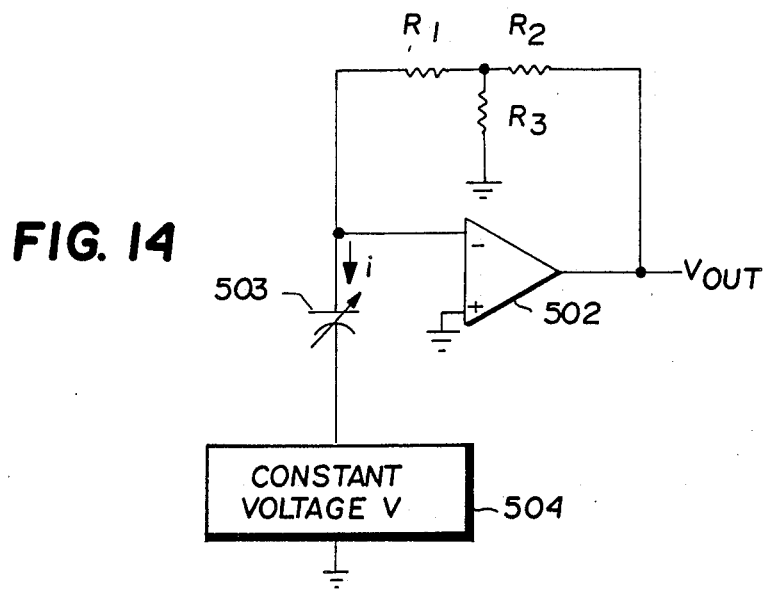

FIG. 14 shows an exemplary high-gain circuit which uses resistor values which are much more easily controlled than a single large resistor. Instead of placing a single large feedback resistor 501 (e.g., 100 megohms) across amplifier 502, a resistor network including resistors $R_1$, $R_2$, $R_3$ are connected in the feedback loop. Resistors $R_1$ and $R_2$ are connected in series between the amplifier 502 output $V_{OUT}$ and the amplifier inverting input (or perhaps between the output 1304 of the FIG. 13B amplifier 1302 and the non-inverting input of amplifier 502), and a resistor $R_3$ is connected between the node at which resistors $R_1$ and $R_2$ are connected and ground. The transresistance gain of the FIG. 14 circuit, $v_{out}/i$, is equal to $R_1 + R_2 + R_1 R_2 R_3$. Typical values for the resistors, $R_1 = R_2 = 100$ Kilohms and $R_3 = 100$ ohms, give a transresistance gain of 100.2 Megohms. This circuit also reduces the bandwidth narrowing effect resulting from the lead-to-lead capacitance of a large feedback resistor.

Construction of Multiple-Pole and Multiple-Phase Capacitors

Figure 15:
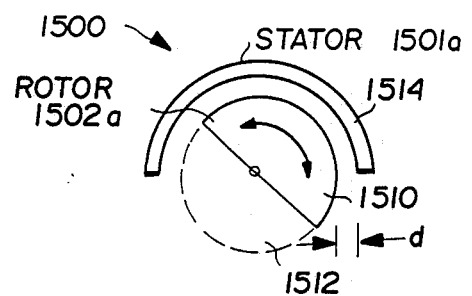
FIG. 15A schematically illustrates the inherent dynamic balance problem existing in a single-pole variable capacitor construction.

FIG. 15A shows an end view of an exemplary basic construction of a single-pole single-phase cylindrical capacitor 1500. A rotor 1502A includes a round rod 1510 with a half circle slot 1512 cut out of at least part of its length. A stator 1501A includes a hollow tubular member 1514 which defines a half-circular arc in end view (as shown). The rotor 1502A is inherently unbalanced and consequently may cause its mechanical imbalance to introduce undesired signal components into the measurement of the shaft signature. This effect can be eliminated by extending the length of the rotor 1502A past the end of the stator 1501A, providing double (rotating) slots past that of the stator, and rotating these slots 180° so as to balance the moments involved. These concepts are shown in FIGS. 16-18B, more detailed views of the stator and rotor.

Figure 16:
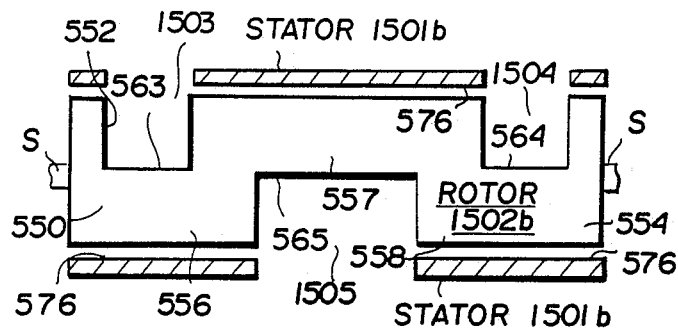

Referring now to FIGS. 16, 18A-18B, rod-like cylindrical rotor element 1502b is machined from a solid conductive metal rod of diameter $D_R$ in the preferred embodiment, and includes a shaft portion S with a relatively small diameter and a body portion 550 with a much larger diameter. Body portion 550 in the preferred embodiment includes circular end portions 552, 554, and semi-circular lobe portions 556, 557, 558. The center lobe portion 557 connects the two end lobe portions 556,558, the end lobe portions each terminating in a corresponding end portion.

In the preferred embodiment, cutouts 1503, 1504, 1505 are cut from body portion 550 (using conventional milling or other machining techniques). Cutouts 1503,1504 have the same axial length, l, in the preferred embodiment, and each define a semi-circular (half cylinder) gap of a certain width. Center cutout 1505 in the preferred embodiment has an axial length $l_C$ in the preferred embodiment which is twice length l.

Tubular stator 1501B (see FIGS. 17A-17B) has an inside diameter $D_S$ which is somewhat greater than the outside diameter $D_R$ of rotor 1501B. Stator portion 1501B is essentially a hollow tube 568 of conductive metal in the preferred embodiment. Cutouts 1503A, 1504A, 1505A (each defining a circular half-cylinder) are removed from tube 568 (using conventional machining techniques). Cutouts 1503A, 1504A have substantially equal axial lengths l in the preferred embodiment (equal to the corresponding axial lengths of corresponding rotor cutouts 1503,1504 in the preferred embodiment). Likewise, the length $l_C$ of stator cutout 1505A is approximately equal to the length $l_C$ of corresponding rotor cutout 1505.

In the preferred embodiment, rotor body 550 is rotatably disposed within tubular hollow stator 1501B with rotor cutout 1503 approximately in registry (with respect to the axis of shaft S) with stator cutout 1503A, rotor cutout 1504 disposed in registry (with respect to the axis of the shaft) with stator cutout 1504A, and rotor cutout 1505 similarly positioned in registry with stator cutout 1505A. There is sufficient clearance between rotor outer surface 550A and stator inner wall 576 so that the rotor is freely rotatable within the stator, and does not electrically contact the stator. The stator 1510b is fixedly mounted with respect to shaft S such that rotor 1502b does not contact the stator during rotation of the shaft.

When rotor cutouts 1503,1504,1505 are in registry with corresponding stator cutouts 1503A,1504A,1505A, a relatively large capacitance exists between rotor lobe portions 556,557,558 (in particular, the portions of the outer rotor wall 550A defined by those lobe portions) and stator inner wall 576. As rotor 1502B rotates with respect to stator 1501B away from this position of maximum capacitance, rotor cutouts 1503-1505 move out of registry with stator cutouts 1503A-1505A, respectively and the rotor lobes occlude part of the stator cutouts—and the capacitance of the transducer decreases linearly (since less of rotor outer surface 550A is in registry with stator inner surface 576). The distance between the inner walls 563,564, 565 of the rotor cutouts and the stator inner wall 576 is much greater than the distance between the cylindrical outer rotor wall 550A at rotor portions 556,558 and the stator wall (so that the rotor cutout inner walls do not contribute appreciably to the capacitance of the transducer). The capacitor shown in FIGS. 16-18 forms a one-pole, single phase capacitor which linearly cycles from minimum to maximum capacitance and back to minimum capacitance once for each 360° rotation of shaft S.

Figure 19:
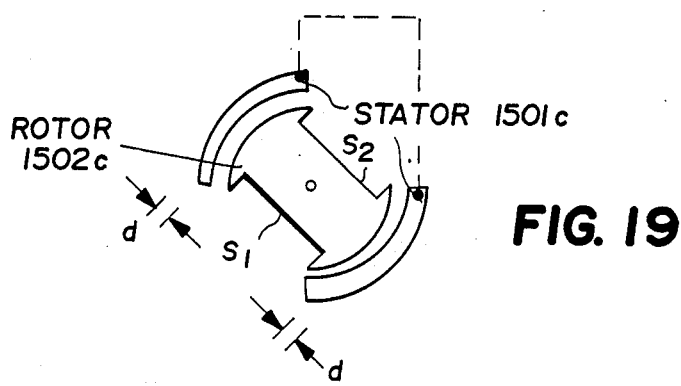

FIG. 19 shows the basic construction of a two pole single phase capacitor which has an inherently balanced rotor. Rotor 1502C has two slots S1, S2 cut into it lengthwise so that the surfaces within the slots cover 90° of the rotor circumference and opposite the surface within the other slot (with respect to the diameter of the rotor). The remaining cylindrical rotor surfaces not within the slots also each cover 90 degrees of the rotor surface and are similarly opposite one another. Stator 1501C has two arc-shaped sections 1601A,1601B which are electrically connected together in the example shown. The resulting FIG. 19 capacitive transducer has an inherently balanced rotor 1502C that will not introduce unwanted vibrations on the shaft signature and the characteristic that the electrical frequency will be twice the rotational frequency of the shaft (the peak value of this signal will be twice the value of that obtained from a one-pole transducer construction).

Figure 20A:
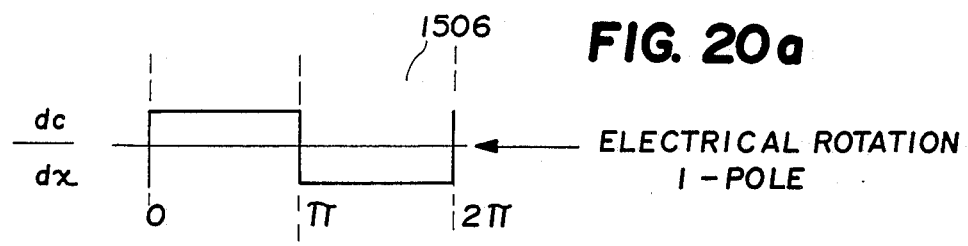
FIGS. 20A–20B are schematic illustrations of waveforms produced by single-pole and two-pole variable capacitors.
Figure 20B:
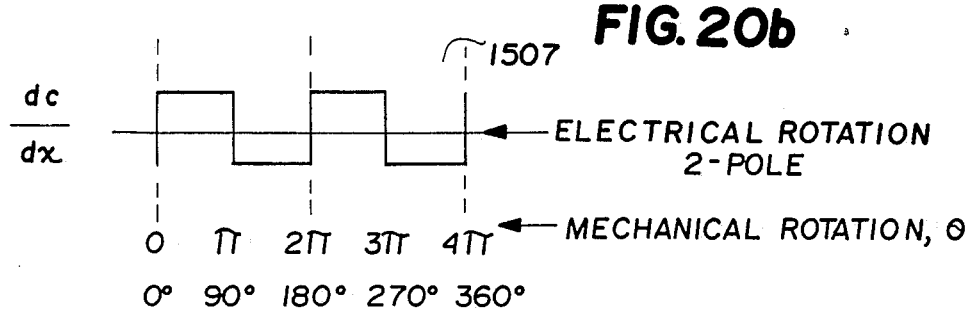

FIGS. 20A-20B show a graphical plot of dC/dx where x is the mechanical rotation angle $\theta$ for the one-pole and two-pole capacitors which have been described. For one complete rotation of the capacitor shaft from zero to 360°, a one-pole capacitor produces a one-cycle electrical waveform 1506 shown in FIG. 20A. A two-pole capacitor will produce two complete electrical cycles 1507 for one complete shaft rotation (see FIG. 20B). It follows that an N-pole capacitor will produce N complete electrical cycles for one shaft revolution (N may have any integer value). Hence, the electrical signal frequency produced by a two-pole capacitor is twice the frequency of mechanical rotation and the peak output voltage is twice that of a one-pole capacitor. (This last statement is true because dC/dt is occurring at two stators rather than one.) An N-pole capacity will produce N times the frequency and N times the voltage of a one-pole capacitor (vibration frequencies remain unchanged).

Figure 21A:
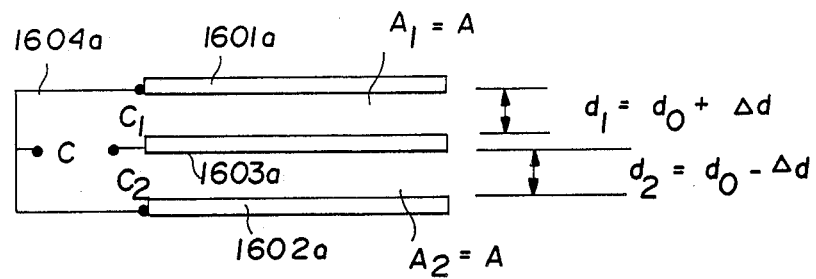
FIGS. 21A and 21B schematically show the tolerance reducing characteristic of the exemplary two-pole capacitor construction shown in FIG. 19.
Figure 21B:
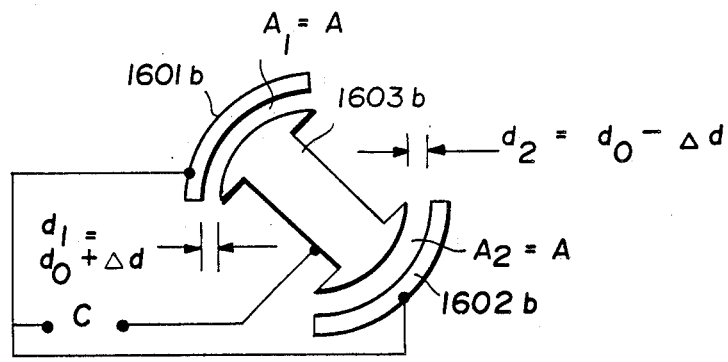

There is another significant advantage to a two-pole capacitor construction as described above: the mechanical tolerances are significantly less critical for a given accuracy as compared to a one-pole construction due to the differential design characteristics of the two pole construction. These differential design characteristics are illustrated in FIGS. 21A and 21B. In FIG. 21A, two parallel (stator equivalent) plates 1601A and 1602A are spaced equidistantly from a (rotor equivalent) plate 1603A. 1604A is an electrical connection between stator plates 1601A and 1602A. A capacitance C1 exists between plates 1601A and 1603A. Likewise, a capacitance C2 exists between plates 1602A and 1603A. d1 and A1 are respectively the separation and area which determine C1, while d2 and A2 are the distance and area parameters which determine the capacitance C between rotor plate 1603 and stator plate 1602A. The total capacitance of the FIG. 21A construction is given by:

$$C = C1 + C2 = \epsilon_0 \frac{A1}{d1} + \epsilon_0 \frac{A2}{d2}. \quad (11a)$$

Actually, A1=A2=A and area does not change in this example. Therefore, Equation 11a reduces to Equation 11b:

$$C = \epsilon_0 A \left[ \frac{1}{d1} + \frac{1}{d2} \right]. \quad (11b)$$

If initially d1=d2=d0 and d0 is allowed to change by a small amount, $\Delta d$, Equation 11b can be expressed as Equation 12 below:

$$C = \epsilon_0 A \left[ \frac{1}{d0 + \Delta d} + \frac{1}{d0 - \Delta d} \right] \quad (12)$$

The first term in Equation 12, $$\frac{1}{d0 + \Delta d}$$

represents the change in C1, and the second term, $$\frac{1}{d0 - \Delta d}$$

represents the change in C2. If $\Delta d$ is on the order of 10% of d0, C1 will increase by about 10% and C2 will decrease by about 10%. The sum of C1 and C2, however, will change by only about 1%—the mutually offsetting capacitance increase and decrease in effect cancelling one another out.

Tilting plate 1603A causes a slight variation in d0 along the length and/or width of the plate. However, this change in C is much smaller than the change in C1 or C2. This "differential" construction depicted in FIG. 21A results in a stable value of C for significant tolerance variations in mechanical construction.

FIG. 21B is a geometry corresponding to FIG. 19 which shows how a two-pole capacitor can be made using a single rotor and a split stator. This capacitor is reasonably accurate despite relative inaccuracies in machining and assembly tolerances. Because of the similarity of forms between FIGS. 21A and 21B, Equation 12 describes the value of capacitance of FIG. 21B also, and the FIG. 21B construction also exhibits the stability obtained from the differential design.

Construction of a Two-Pole, Three-Phase Capacitor

FIGS. 22A–22F show the presently preferred embodiment of an exemplary cylindrical two-pole, three-phase cylindrical capacitor 1800 in accordance with the present invention. This capacitor 1800 is suitable for use with the preferred 3-phase circuit shown in FIG. 10 (the FIG. 10 circuit preferably using the FIG. 13B input stage).

Capacitor 1800 includes a round aluminum rod 1802 machined to form a single common rotor element 1804. Two longitudinal slots 1806A, 1806B are milled into rod 1802 oppositely along the axis leaving rod cylindrical portions 1808A, 1808B as the rotating cylindrical capacitive plate area. The combined circumferences of cylindrical surfaces 1808A, 1808B equal the combined circumferences milled out of rod 1802 to form slots 1806A, 1806B in the preferred embodiment.

Figure 22B:
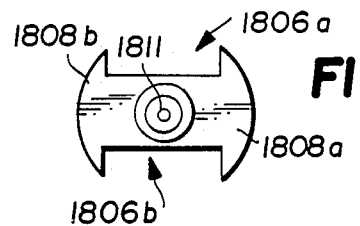
FIGS. 22A–22F show the presently preferred exemplary embodiment of a practical, inexpensive two-pole, three-phase cylindrical capacitor in accordance with the present invention.
Figure 22C:
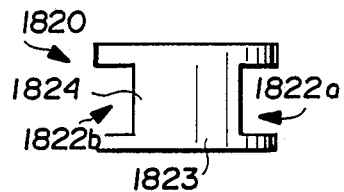
Figure 22D:
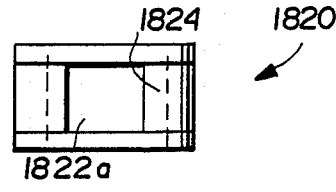
Figure 22A:
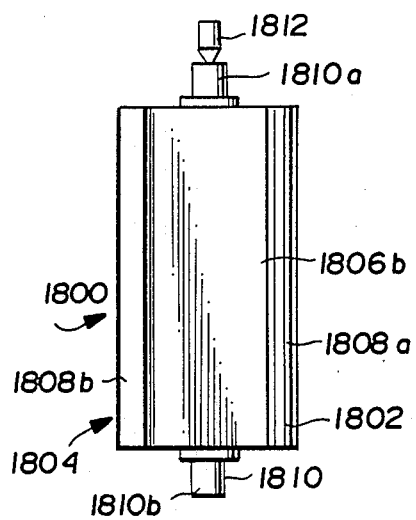
Figure 22E:
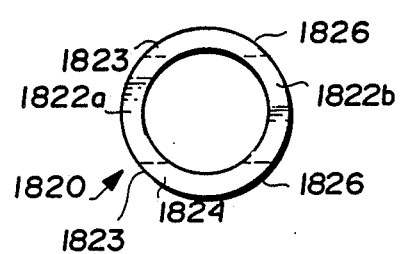

A drive shaft 1810 is inserted into a bore defined longitudinally down the center of rod 1802 (or machined from the rod ends as desired) to permit turning of the rotor 1804. Shaft 1810 has a first end 1810A and a second end 1810B. End 1810B is a free shaft end (to enable bearing mounting), and passes through the inner ring of a bearing (not shown) in the preferred embodiment. End 1810A is a cupped end of the shaft, and has a depression 1811 defined in it to permit contact with a point contact common brush 1812. FIGS. 22C–22E depict various views of stator 1820, which in the preferred embodiment is formed by milling windows 1822A, 1822B into several discrete sections of aluminum tube 1824. The unmilled portions 1823 of tube sections 1826 serve as the stator plates of the capacitor 1800. The combined inside circumference of the unmilled sections 1823 equals the circumference of milled out portions 1822 to form the active area of the stator plate. If two poles are desired, the width of stator "windows" 1822 may be approximately 180°. If three poles are used, the rotational "width" of the windows 1822 would be within approximately 120° to 180°. The axial construction of the rotor 1804 by milling slots 1806 uniformly along the rotor length produces the desirable effect that there is no sensitivity of any phase to axial vibrations or variations.

Figure 22F:
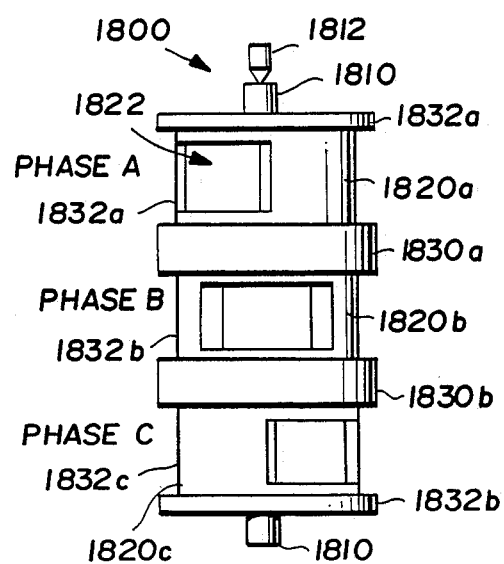

FIG. 22F is a side view of three stator elements 1820A, 1820B, 1820C axially stacked one on top of another and separated from one another by insulators 1830. The stator windows 1822 are rotated relative to one another so that the "notches" in the waveforms produced by the capacitor are electrically rotated relative to one another. The three stator elements 1820A–1820C cooperate with a single common rotor element 1804. End caps 1832A, 1832B hold bearings (not shown) as well as the stators 1820 in the preferred embodiment. The complete rotor 1804 is mounted inside the stator elements 1820A–1820C and held in place by bearings and insulating end caps 1832. An electrical contact 1812 is shown schematically as a point bearing contacting rotor shaft end depression 1811, but may consist of a brush, conducting fluid, or magnetically held conductive powder. This contact serves as a single common electrical connection to the rotor 1804 in the preferred embodiment.

With respect to exemplary dimensions, a suitable overall length of rotor 1804 might be about three inches, a suitable rotor diameter might be 1.000 inches, and a suitable spacing between rotor 1804 and stators 1820 might be (d1, d2)=0.007 inches (with reference to FIG. 21B).

1832A, 1832B and 1832C are electrical connections which connect to plural corresponding phases (i.e., stators) of the capacitor 1800. These three phase connections 1832 may be connected, for example, to the inverting inputs of op amps 502A, 502B, 502C shown in FIG. 10, and the contact 1812 may be connected to ground potential. The signals produced by the three phases 1832 are the same as those depicted in FIGS. 10A–10C for the embodiment shown.

Note that the resulting output of the FIG. 10 circuit indicates instantaneous variations in shaft rotational velocity, but does not indicate the direction of shaft rotation. Moreover, in a two-pole device, the doubling of frequency corresponding to rotation introduces a 180° degree uncertainty in the position of the shaft 1810. In many applications, the direction of shaft rotation is a constant and there is therefore no need to sense direction—and absolute shaft positional information is also not required.

There is an electrical rotation between two phases in a two or three-phase device which is considerably different from 90°, so that these two phases may be used to determine direction of rotation if such information is required. The switching or square-wave bipolar output waveforms available from a 90° or quadrature two-phase arrangement provides a simple 2-bit binary quadrant code which might be used to provide direction of rotation information. An additional device may be used to determine the shaft's zero position rather than a phase signal if desired. For example, the rotor 1804 could have a photocoupler slot defined in it, or a magnet or mirror could be embedded in it (e.g., at shaft end 1810A) for detection of the leading edge of a particular phase to get a "go" synchronization (and to also obtain additional information regarding absolute rotor positions).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A shaft rotation analyzer for analyzing the motion of a rotating shaft, said analyzer comprising:
    a substantially constant direct current (DC) voltage source;
    capacitive transducer means electrically connected to said constant DC voltage source and mechanically coupled to said shaft for changing capacitance with time in response to the instantaneous velocity of said shaft and for causing a time-varying current to flow to/from said voltage source in response to said shaft rotation; and
    converting means electrically couple to said capacitor transducer means for converting said time-varying current to a signal directly indicating the instantaneous angular speed of said shaft.

2. An analyzer as in claim 1 wherein said capacitive transducer means includes a variable capacitor which continuously changes capacitance in response to rotation of such shaft and wherein said signal directly indicates the time rate of change of said capacitance.

3. An analyzer as in claim 2 wherein:

said variable capacitor has plural discrete elements which are mutually electrically isolated from one another;

said constant DC voltage source is connected to each of said elements; and said converting means is independently responsive to current levels flowing to/from each of said plural elements, and includes means for selecting current levels generated by one of said elements and deselecting current levels generated by the other elements.

4. An analyzer as in claim 2 wherein said transducer means includes rotatable rotor means coupled to said shaft for defining a first cylindrical surface, and a stationary stator means for defining a second cylindrical surface spaced from and opposing said first surface, said capacitance depending on the surface area of said first cylindrical surface opposing said second cylindrical surface.

5. An analyzer as in claim 4 wherein said first surface rotates relative to said second surface with rotation of said shaft, the surface area of said first surface opposing said second surface depending upon the position of said shaft.

6. An analyzer as in claim 1 wherein said transducer means includes:

a stator conductive member fixed in position relative to said rotating shaft; and a rotor conductive member mechanically coupled to said shaft and disposed near said stator member, a capacitance existing between said stator and rotor members which changes continuously over at least a portion of the range of rotation of said shaft in response to shaft rotation.

7. A shaft rotation analyzer as in claim 1 wherein said converting means includes:

a linear operational amplifier having an output terminal and first and second input terminals, a feedback resistor connected between said output terminal and said first input terminal, and means for effectively connecting said the output of said constant DC voltage source across said capacitive transducer means through said first and second input terminals.

8. A shaft rotation analyzer as in claim 1 wherein said converting means includes:

a linear operational amplifier having an output terminal and also having inverting and non-inverting input terminals, and means for effectively connecting said constant DC voltage source across said capacitive transducer means through said inverting and non-inverting input terminals so that said time-varying current flows into/out of at least one of said operational amplifier inverting and non-inverting input terminals.

9. A shaft rotation analyzer as in claim 1 wherein said converting means includes:

a linear operational amplifier having an output terminal and also having first and second input terminals, said capacitive transducer means being coupled to said first input terminal, said constant DC voltage source being coupled to said second input terminal; and a feedback impedance connected between said output terminal and at least one of said first and second input terminals, wherein said first and second input terminals remain at the same electrical potential except for a small offset voltage such that the constant DC source voltage is applied across said capacitive transducer means.

10. A shaft rotation analyzer as in claim 1 wherein said converting means includes:

a linear operational amplifier having an output terminal and also having first and second input terminals, said capacitive transducer means and said constant DC voltage source being coupled in series to said first input terminal; and a feedback impedance connected between said output terminal and at least one of said first and second input terminals, wherein said first and second input terminals remain at the same electrical potential except for a small offset voltage such that the constant DC source voltage is applied across said capacitive transducer means.

11. A shaft rotation detector comprising:

variable capacitor means mechanically coupled to a rotatable shaft for providing a capacitance which varies in response to rotation of said shaft;

DC source means electrically coupled to said capacitor means for applying a substantially constant electrical potential to said capacitor means, said potential inducing a charging current responsive to the rate of change of said varying capacitance to flow in response to rotation of said shaft; and signal producing means electrically coupled to said capacitor means for producing a signal indicating the instantaneous angular speed of said shaft in response to said induced current.

12. A shaft rotation detector as in claim 4 wherein said variable capacitor means includes first and second capacitor plates, and said applying means comprises constant direct current voltage source means connected to said plates for applying a constant voltage across said capacitor plates.

13. A shaft rotation detector as in claim 11 wherein said variable capacitor means changes capacitance substantially linearly in response to shaft rotation angle over at least a portion of the angle through which said shaft rotates.

14. A shaft rotation detector as in claim 11 wherein said signal producing means comprises:

a linear operational amplifier having an output terminal and first and second input terminals, a feedback resistor connected between said output terminal and said first input terminal, and means for effectively connecting said DC source means across said capacitor means through said first and second input terminals so that said constant potential is applied across said capacitor means.

15. A shaft rotation detector as in claim 11 wherein said signal producing means comprises:

a linear operational amplifier having an output terminal and also having inverting and non-inverting input terminals, and means for effectively connecting said DC source means across said capacitor means through inverting and non-inverting input terminals so that the output of said DC source means is applied across said capacitor means and said changing current flows into/out of at least one of said operational amplifier inverting and non-inverting input terminals.

16. A shaft rotation detector as in claim 11 wherein said signal producing means includes:
   a linear operational amplifier having an output terminal and also having first and second input terminals, said capacitor means being coupled to said first input terminal, said DC source means being coupled to said second input terminal; and
   a feedback impedance connected between said output terminal and at least one of said first and second input terminals,
   wherein said first and second input terminals remain at the same electrical potential except for a small offset voltage such that said constant DC potential is applied across said capacitor means.

17. A shaft rotation detector as in claim 11 wherein said signal producing means includes:
   a linear operational amplifier having an output terminal and also having first and second input terminals, said capacitor means and said DC source means being coupled together in series, said series-connected capacitor means and DC source means being coupled to said first input terminal; and
   a feedback impedance connected between said output terminal and at least one of said first and second input terminals,
   wherein said first and second input terminals remain at the same electrical potential except for a small offset voltage such that the constant DC potential is applied across said capacitor means.

18. A shaft rotation detector comprising:
   a variable capacitor including a stator element a rotor element, and a rotatable shaft connected to said rotor element, an electrical capacitance existing between said stator element and said rotor element which varies in response to rotation of said shaft;
   amplifier means including first and second input terminals and an output terminal, said first input terminal being connected to one of said variable capacitor stator element and variable capacitor rotor element; and
   constant direct current (DC) voltage source means, connected to said amplifier means second input terminal, for causing a substantially constant DC voltage to exist between said stator element and rotor element,
   said amplifier means for producing an angular speed signal having a magnitude responsive to rate of change of the electrical capacitance of said variable capacitor at said output terminal.

19. A detector as in claim 18 wherein said signal includes a component responsive to the instantaneous angular velocity of said shaft.

20. A shaft rotation detector as in claim 18 wherein said amplifier means includes:
   a linear operational amplifier having an output terminal and first and second input terminals,
   a feedback resistor connected between said output terminal and said first input terminal, and
   means for effectively connecting said capacitor and said constant DC voltage source means in series with said first and second input terminals so that the output of said constant DC voltage source means is applied across said capacitor.

21. A shaft rotation detector as in claim 18 wherein said amplifier means includes:

a linear operational amplifier having an output terminal and also having inverting and non-inverting input terminals, and
means for effectively connecting said constant DC voltage source means across said capacitor through said inverting and non-inverting input terminals such that said time-varying current flows into/out of at least one of said operational amplifier inverting and non-inverting input terminals.

22. A shaft rotation detector as in claim 18 wherein said amplifier means includes:
   a linear operational amplifier having an output terminal and also having first and second input terminals, said capacitor being coupled to said first input terminal, said constant DC voltage source means being coupled to said second input terminal; and
   a feedback impedance connected between said output terminal and at least one of said first and second input terminals,
   wherein said first and second input terminals remain at the same electrical potential except for a small offset voltage such that the constant DC source means voltage is applied across said variable capacitor.

23. A shaft rotation analyzer as in claim 18 wherein said amplifier means includes:
   a linear operational amplifier having an output terminal and also having first and second input terminals, said capacitor and said constant DC voltage source means being coupled in series to said first input terminal; and
   a feedback impedance connected between said output terminal and at least one of said first and second input terminals,
   wherein said first and second input terminals remain at the same electrical potential except for a small offset voltage such that the constant DC source means voltage is applied across said capacitor.

24. Apparatus for measuring rotation of a shaft, said apparatus comprising:
   a variable capacitor assembly mechanically coupled to said shaft, said assembly including first and second capacitor elements electrically isolated from one another;
   means electrically connected to said first and second capacitor elements for inducing a first current to flow to/from said first capacitive element in response to rotation of said shaft and for inducing a second current to flow to/from said second capacitive element also in response to rotation of said shaft, a non-zero electrical phase angle existing between said first and second currents;
   first converting means connected to said first capacitor element for converting said first current to a first electrical waveform;
   second converting means connected to said second capacitor element for converting said second current to a second electrical waveform; and
   means connected to receive said first and second electrical waveforms for selecting said first waveform whenever said second waveform is discontinuous and for selecting said second waveform whenever said first waveform is discontinuous.

25. Apparatus as in claim 24 wherein said selecting means comprises:
   first absolute value means connected to receive said first waveform for producing a first absolute value signal representing the absolute value of said first waveform;

second absolute value means connected to receive said second waveform for producing a second absolute value signal representing the absolute value of said second waveform; and means connected to receive said first and second absolute value signals for selecting the absolute value signal with the greatest amplitude.

26. Apparatus as in claim 25 wherein said absolute value signal selecting means includes:
a first diode having an anode terminal and a cathode terminal, said anode terminal being connected to receive said first absolute value signal; and
a second diode having an anode terminal and a cathode terminal, said anode terminal being connected to receive said second absolute value signal, said second diode cathode being connected to said first diode cathode.

27. Apparatus as in claim 25 wherein said absolute value signal selecting means includes:
first diode means connected to receive said first absolute value signal for passing said first signal only when said first signal amplitude exceeds said second absolute value signal amplitude; and
second diode means connected to receive said second absolute value signal for passing said second signal only when the second signal amplitude exceeds said first absolute value signal amplitude.

28. Apparatus as in claim 24 wherein:
said variable capacitor includes a third capacitor element electrically isolated from said first and second elements;
said inducing means is also electrically connected to said third capacitor element and is also for inducing a third current to flow to/from said third capacitive element in response to rotation of said shaft, a non-zero electrical phase angle existing between said first and second currents and a non-zero phase angle existing between said first and third currents;
said apparatus further includes third converting means connected to said third capacitor element for converting said third current to a third electrical waveform; and
said selecting means is connected to receive said third waveform and includes means for selecting the one of said first, second and third waveforms having the greatest amplitude.

29. Apparatus as in claim 24 wherein said first and second converting means each includes means for reducing frequency response degradation due to stray capacitance.

30. Apparatus as in claim 24 wherein said signal selected by said selecting means includes a first signal component representing the instantaneous change in angular velocity of said shaft and a second signal component representing the instantaneous change in angular position of said shaft.

31. Apparatus as in claim 30 further including shaft position encoding means mechanically coupled to said shaft for sensing whenever said shaft position matches at least one predetermined shaft position.

32. Apparatus for measuring rotation of a shaft, said apparatus comprising:
variable capacitor means mechanically coupled to said shaft means for providing a capacitance which changes continuously over at least a portion of the rotational angle of said shaft;
means electrically connected to said variable capacitor means for applying a constant DC voltage across said variable capacitor means and inducing a current to flow to/from said capacitor means in response to said capacitance change; and
converting means connected to receive said current for converting said current to an electrical signal having a component which represents the time rate of change of said capacitance.

33. Apparatus as in claim 32 wherein said converting means includes:
a linear operational amplifier having an output terminal and first and second input terminals,
a feedback resistor connected between said output terminal and said first input terminal, and
means for effectively connecting said constant DC voltage across said variable capacitor means through said first and second input terminals.

34. Apparatus as in claim 32 wherein said converting means includes:
a linear operational amplifier having an output terminal and also having inverting and non-inverting input terminals, and
means for effectively connecting said constant DC voltage across said variable capacitor means through said inverting and non-inverting input terminals so that said current flows into/out of at least one of said operational amplifier inverting and non-inverting input terminals.

35. Apparatus as in claim 32 wherein said converting means includes:
a linear operational amplifier having an output terminal and also having first and second input terminals, said variable capacitor means being coupled to said first input terminal, said constant DC voltage being coupled to said second input terminal; and
a feedback impedance connected between said output terminal and at least one of said first and second input terminals,
wherein said first and second input terminals remain at the same electrical potential except for a small offset voltage such that the constant DC source voltage is applied across said capacitor means.

36. Apparatus as in claim 32 wherein said converting means includes:
a linear operational amplifier having an output terminal and also having first and second input terminals, said capacitive transducer means and said inducing means being coupled in series to said first input terminals; and
a feedback impedance connected between said output terminal and at least one of said first and second input terminals,
wherein said first and second input terminals remain at the same electrical potential except for a small offset voltage such that the constant DC source voltage is applied across said capacitor means.

37. A shaft rotation detector comprising:
variable capacitor means mechanically coupled to a rotatable shaft for providing a capacitance which varies in response to rotation of said shaft;
applying means electrically coupled to said capacitor means for applying a substantially constant direct current electrical potential to said capacitor means, said potential inducing a current responsive to said varying capacitance to flow through said variable capacitor means; and producing means electrically coupled to said capacitor means for producing a signal indicating the shaft rotational speed in response to said induced current.

38. A shaft rotation detector as in claim 37 wherein said producing means includes:
   a linear operational amplifier having an output terminal and first and second input terminals,
   a feedback resistor connected between said output terminal and said first input terminal, and
   means for effectively connecting said constant DC electrical potential across said variable capacitor means through said first and second input terminals.

39. A shaft rotation detector as in claim 37 wherein said producing means includes:
   a linear operational amplifier having an output terminal and also having inverting and non-inverting input terminals, and
   means for effectively connecting said constant DC electrical potential across said variable capacitor means through said inverting and non-inverting input terminals so that said current flows into/out of at least one of said operational amplifier inverting and non-inverting input terminals.

40. A shaft rotation detector as in claim 37 wherein said producing means includes:
   a linear operational amplifier having an output terminal and also having first and second input terminals, said variable capacitor means being coupled to said first input terminal, said constant DC electrical potential being coupled to said second input terminal; and
   a feedback impedance connected between said output terminal and at least one of said first and second input terminals,
   wherein said first and second input terminals remain at the same electrical potential except for a small offset voltage such that the constant DC electrical potential is applied across said capacitor means.

41. A shaft rotation detector as in claim 37 wherein said producing means includes:
   a linear operational amplifier having an output terminal and also having first and second input terminals, said capacitive transducer means and said applying means being coupled in series to said first input terminal, and
   a feedback impedance connected between said output terminal and at least one of said first and second input terminals,
   wherein said first and second input terminals remain at the same electrical potential except for a small offset voltage such that the constant DC electrical potential is applied across said capacitor means.

42. A method for measuring rotation of a shaft comprising the steps of:
   (1) rotating a shaft mechanically coupled to a variable capacitor assembly having first and second electrically isolated capacitor elements;
   (2) inducing a first current to flow to/from said first capacitor element in response to rotation of said shaft;
   (3) inducing a second current to flow to/from said second capacitive element also in response to rotation of said shaft, a non-zero electrical phase angle existing between said first and second currents;
   (4) converting said first current to a first electrical waveform;
   (5) converting said second current to a second electrical waveform;
   (6) selecting said first waveform whenever said second waveform is discontinuous; and
   (7) selecting said second waveform whenever said first waveform is discontinuous.

43. A method as in claim 42 wherein said selecting step includes:
   generating the absolute value of said first electrical waveform;
   generating the absolute value of said second electrical waveform; and
   selecting the one of said first and second electrical waveform having the greatest absolute value.

44. Sensing apparatus coupled to a rotatable member for measuring the rotational speed of said member, said apparatus comprising:
   a variable capacitor coupled to said member, said variable capacitor providing a capacitance which changes in response to rotation of said rotatable member;
   a DC voltage source providing a substantially constant DC potential at an output thereof; and
   amplifier circuit means having at least one input terminal and an output terminal, said substantially constant DC potential being coupled across said variable capacitor through said input terminal, said amplifier circuit means for producing at said output terminal a signal that is directly proportional to the rate of change of the capacitance of said variable capacitor with respect to time and indicates the signature of said rotational member.

45. Sensing apparatus as in claim 44 wherein:
   said variable capacitor includes first and second terminals; and
   said amplifier circuit means comprises a linear operational amplifier having an inverting input terminal, a non-inverting input terminal, and said output terminal, substantially no voltage differential existing between said inverting and non-inverting input terminals, said variable capacitor first terminal being connected to one of said inverting and non-inverting input terminals, said DC voltage source output being coupled to one of: (i) the other of said inverting and non-inverting input terminals, and (ii) said variable capacitor second terminal.

46. Sensing apparatus as in claim 44 wherein said signal produced by said amplifier circuit means is directly indicative of the rotational speed of said member.

* * * * *

UNITED STATES PATENT AND TRADEMARK OFFICE
CERTIFICATE OF CORRECTION

PATENT NO. : 4,963,829

DATED : 16 October 1990

INVENTOR(S) : John A. Wereb

It is certified that error appears in the above-identified patent and that said Letters Patent is hereby corrected as shown below:

Column 13, line 68 should read as follows:

-- $V_{out}^i$, is equal to $R_1+R_2+R_1R_2/R_3$. Typical values for --

Front page of patent should include Field 73 (Assignee) as follows:

-- Assignee: Lake Shore Cryotronics, Inc.
Westerville, Ohio --

Signed and Sealed this

Twenty-eighth Day of April, 1992

Attest:

HARRY F. MANBECK, JR.

*Attesting Officer*  *Commissioner of Patents and Trademarks*